(12) United States Patent
Ross

(10) Patent No.: US 12,512,283 B2
(45) Date of Patent: Dec. 30, 2025

(54) EYEGLASSES NOSE PIECE SWITCH

(71) Applicant: Hourglass Medical LLC, Monticello, IL (US)

(72) Inventor: Jeremy B. Ross, Monticello, IL (US)

(73) Assignee: Hourglass Medical LLC, Monticello, IL (US)

(*) Notice: Subject to any disclaimer, the term of this patent is extended or adjusted under 35 U.S.C. 154(b) by 190 days.

(21) Appl. No.: 18/466,656

(22) Filed: Sep. 13, 2023

(65) Prior Publication Data

US 2024/0112871 A1 Apr. 4, 2024

Related U.S. Application Data

(60) Provisional application No. 63/378,329, filed on Oct. 4, 2022.

(51) Int. Cl.
*H01H 35/00* (2006.01)
*G02C 5/12* (2006.01)
(Continued)

(52) U.S. Cl.
CPC .............. *H01H 35/003* (2013.01); *G02C 5/12* (2013.01); *G02C 5/146* (2013.01); *H01H 36/008* (2013.01); *H01H 2036/0093* (2013.01)

(58) Field of Classification Search
CPC ......... H01H 36/008; H01H 2036/0093; H01H 35/00; H01H 35/003; H01H 21/00;
(Continued)

(56) References Cited

U.S. PATENT DOCUMENTS

| | | |
|---|---|---|
| 3,227,836 A | 1/1966 | Renwick, Sr. |
| 4,920,466 A | 4/1990 | Liu |

(Continued)

FOREIGN PATENT DOCUMENTS

| | | |
|---|---|---|
| CA | 2268980 A1 | 4/1998 |
| CN | 208338996 U | 1/2019 |

(Continued)

OTHER PUBLICATIONS

"Detent", Merriam-Webster, definition, downloaded Jan. 23, 2024, from https://www.merriam-webster.com/dictionary/detent, 14 pgs.
(Continued)

*Primary Examiner* — Anthony R Jimenez
(74) *Attorney, Agent, or Firm* — Ascenda Law Group, PC

(57) ABSTRACT

Eyewear or other head-worn apparatus are fitted with an activation accessory that includes one or more switch elements integrated with or attached to a nose piece of the eyewear. The switch elements are communicably coupled to a processor-based controller so as to provide input signals to the controller responsive to wearer-initiated activations of the switch elements through interaction with a frame or temple piece of the eyewear. Upon receipt, the controller evaluates the input signals to determine whether or not they represent a command for the controlled device by assessing the input signals for a signal pattern indicative of such a command, and then, if the evaluation determines that the input signals do represent the command, issues the command to the controlled device. Otherwise the controller proceeds to receive and evaluate further input signals from the switch elements in a like manner as the first input signals.

20 Claims, 13 Drawing Sheets

(51) Int. Cl.
*G02C 5/14* (2006.01)
*H01H 36/00* (2006.01)

(58) Field of Classification Search
CPC ........ H01H 13/00; A42B 3/044; A42B 3/303;
G06F 3/015; G06F 3/0156; G02C 5/12;
G02C 5/146
USPC ....................................................... 200/330
See application file for complete search history.

(56) References Cited

U.S. PATENT DOCUMENTS

| | | |
|---|---|---|
| 4,970,589 A | 11/1990 | Hanson et al. |
| 5,083,246 A | 1/1992 | Lambert |
| 5,226,712 A | 7/1993 | Luca |
| 5,946,071 A | 8/1999 | Feldman |
| 5,951,141 A | 9/1999 | Bradley |
| 6,016,160 A | 1/2000 | Coombs et al. |
| 6,046,712 A | 4/2000 | Beller et al. |
| 6,126,294 A | 10/2000 | Koyama et al. |
| 6,560,029 B1 | 5/2003 | Dobbie et al. |
| 6,612,695 B2 | 9/2003 | Waters |
| 6,896,389 B1 | 5/2005 | Paul |
| 7,184,903 B1 | 2/2007 | Williams et al. |
| 7,303,303 B1 | 12/2007 | Haynes |
| 7,580,028 B2 | 8/2009 | Jeong et al. |
| 7,814,903 B2 | 10/2010 | Osborne et al. |
| 8,188,937 B1 | 5/2012 | Amafuji et al. |
| 8,337,014 B2 | 12/2012 | Kokonaski et al. |
| 8,587,514 B2 | 11/2013 | Lundstrom |
| 8,708,483 B2 | 4/2014 | Kokonaski et al. |
| 9,013,264 B2 | 4/2015 | Parshionikar et al. |
| 9,285,609 B1 | 3/2016 | Rost |
| 9,632,318 B2 | 4/2017 | Goto et al. |
| 10,477,298 B2 | 11/2019 | Cruz-Hernandez |
| 10,736,560 B2 | 8/2020 | Haugland et al. |
| 2002/0027777 A1 | 3/2002 | Takasu |
| 2002/0122014 A1 | 9/2002 | Rajasingham |
| 2003/0202341 A1 | 10/2003 | McClanahan |
| 2004/0008158 A1 | 1/2004 | Chi et al. |
| 2004/0136178 A1 | 7/2004 | Yu |
| 2004/0189930 A1 | 9/2004 | Skuro |
| 2004/0252487 A1 | 12/2004 | McCullough et al. |
| 2005/0102133 A1 | 5/2005 | Rees |
| 2005/0105285 A1 | 5/2005 | Maden |
| 2005/0226433 A1 | 10/2005 | McClanahan |
| 2006/0048286 A1 | 3/2006 | Donato |
| 2006/0061544 A1 | 3/2006 | Min et al. |
| 2006/0119539 A1 | 6/2006 | Kato et al. |
| 2006/0238878 A1 | 10/2006 | Miyake et al. |
| 2007/0243835 A1 | 10/2007 | Zhu et al. |
| 2007/0277819 A1 | 12/2007 | Osborne et al. |
| 2008/0216215 A1 | 9/2008 | Lee |
| 2009/0073082 A1 | 3/2009 | Yoshikawa |
| 2009/0187124 A1 | 7/2009 | Ludlow et al. |
| 2009/0251661 A1 | 10/2009 | Fuziak, Jr. |
| 2009/0267805 A1 | 10/2009 | Jin et al. |
| 2010/0014699 A1 | 1/2010 | Anderson et al. |
| 2010/0081895 A1 | 4/2010 | Zand |
| 2010/0177277 A1 | 7/2010 | Kokonaski et al. |
| 2010/0250231 A1 | 9/2010 | Almagro |
| 2010/0271588 A1* | 10/2010 | Kokonaski ............. G02C 7/083 351/158 |
| 2010/0283412 A1 | 11/2010 | Baudou |
| 2010/0327028 A1 | 12/2010 | Nakabayashi et al. |
| 2011/0089207 A1 | 4/2011 | Tricoukes et al. |
| 2011/0221672 A1 | 9/2011 | Osterhout et al. |
| 2011/0288445 A1 | 11/2011 | Lillydahl et al. |
| 2011/0317402 A1 | 12/2011 | Cristoforo |
| 2012/0002046 A1 | 1/2012 | Rapoport et al. |
| 2012/0052469 A1 | 3/2012 | Sobel et al. |
| 2012/0127420 A1 | 5/2012 | Blum et al. |
| 2012/0127423 A1 | 5/2012 | Blum et al. |
| 2012/0206323 A1 | 8/2012 | Osterhout et al. |
| 2012/0229248 A1 | 9/2012 | Parshionikar et al. |
| 2012/0242698 A1 | 9/2012 | Haddick et al. |
| 2012/0262667 A1 | 10/2012 | Willey |
| 2012/0287284 A1 | 11/2012 | Jacobsen et al. |
| 2012/0312669 A1 | 12/2012 | Breeds et al. |
| 2013/0016426 A1 | 1/2013 | Chiang |
| 2013/0201439 A1 | 8/2013 | Kokonaski et al. |
| 2013/0278881 A1 | 10/2013 | Kokonaski et al. |
| 2013/0300649 A1 | 11/2013 | Parkinson et al. |
| 2013/0329183 A1 | 12/2013 | Blum et al. |
| 2014/0000014 A1 | 1/2014 | Redpath et al. |
| 2014/0028966 A1 | 1/2014 | Blum et al. |
| 2014/0079257 A1 | 3/2014 | Ruwe et al. |
| 2014/0082587 A1 | 3/2014 | Fleischmann |
| 2014/0160250 A1 | 6/2014 | Pomerantz et al. |
| 2014/0249354 A1 | 9/2014 | Anderson et al. |
| 2014/0259287 A1 | 9/2014 | Waters et al. |
| 2014/0259319 A1 | 9/2014 | Ross et al. |
| 2014/0354397 A1 | 12/2014 | Quintal, Jr. et al. |
| 2015/0094715 A1 | 4/2015 | Laufer et al. |
| 2015/0109769 A1 | 4/2015 | Chang |
| 2016/0054570 A1 | 2/2016 | Bosveld et al. |
| 2016/0178903 A1 | 6/2016 | Nakajima |
| 2016/0216519 A1 | 7/2016 | Park et al. |
| 2016/0255305 A1 | 9/2016 | Ritchey et al. |
| 2016/0313801 A1 | 10/2016 | Wagner et al. |
| 2016/0316181 A1 | 10/2016 | Hamra |
| 2017/0075198 A1 | 3/2017 | Kuroki |
| 2017/0215717 A1 | 8/2017 | Orringer et al. |
| 2017/0227780 A1 | 8/2017 | Tatsuta et al. |
| 2017/0257723 A1 | 9/2017 | Morishita et al. |
| 2017/0270820 A1 | 9/2017 | Ashby |
| 2017/0322641 A1 | 11/2017 | Osterhout |
| 2018/0003764 A1 | 1/2018 | Menon et al. |
| 2018/0242908 A1 | 8/2018 | Sazonov et al. |
| 2019/0142349 A1 | 5/2019 | Schorey et al. |
| 2019/0178476 A1 | 6/2019 | Ross |
| 2019/0178477 A1 | 6/2019 | Ross |
| 2019/0265802 A1 | 8/2019 | Parshionikar |
| 2020/0059467 A1 | 2/2020 | Chereshnev |
| 2020/0072596 A1 | 3/2020 | Pang et al. |
| 2020/0097084 A1 | 3/2020 | Ross |
| 2020/0249752 A1 | 8/2020 | Parshionikar |
| 2020/0285080 A1 | 9/2020 | Belli et al. |
| 2020/0320412 A1 | 10/2020 | Gillian et al. |
| 2021/0029435 A1 | 1/2021 | Siahaan et al. |

FOREIGN PATENT DOCUMENTS

| | | | |
|---|---|---|---|
| DE | 10 2006 015334 A1 | 10/2007 | |
| EP | 1 928 296 B1 | 5/2011 | |
| FR | 2832906 A1 | 6/2003 | |
| JP | 2002268815 A | 9/2002 | |
| JP | 2009116609 A | 5/2009 | |
| WO | WO 96/37730 A1 | 11/1996 | |
| WO | WO 2004/087258 A1 | 10/2004 | |
| WO | 2009/133258 A1 | 11/2009 | |
| WO | WO 2010/062479 A1 | 6/2010 | |
| WO | WO 2014/068371 A1 | 5/2014 | |
| WO | WO 2015/124937 A1 | 8/2015 | |
| WO | WO 2017/065663 A1 | 4/2017 | |
| WO | WO 2020/117597 A1 | 6/2020 | |
| WO | WO 2020/248778 A1 | 12/2020 | |
| WO | WO 2022/098973 A1 | 5/2022 | |

OTHER PUBLICATIONS

International Search Report and Written Opinion mailed Jan. 22, 2024, from the ISA/US, for International Application No. PCT/US23/32656 (filed Sep. 13, 2023), 13 pgs.

Etani, Takehito, "The Masticator", The Masticator: the social mastication (2016), downloaded from: http://www.takehitoetani.com/masticator, 5 pages.

Goel, Mayank; et al., "Tongue-in-Cheek: Using Wireless Signals to Enable Non-Intrusive and Flexible Facial Gestures Detection", HMDs & Wearables to Overcome Disabilities, CHI 2015, Apr. 18-23, 2015, Crossings, Seoul, Korea, pp. 255-258.

(56) References Cited

OTHER PUBLICATIONS

International Preliminary Report on Patentability mailed Mar. 3, 2021, from the IPEA/US, for International Patent Application No. PCT/US2019/063717 (filed Nov. 27, 2019), 6 pgs.
International Preliminary Report on Patentability mailed Aug. 4, 2020, from the IPEA/US, for International Application No. PCT/US2018/062767 (filed Nov. 28, 2018), 18 pgs.
International Preliminary Report on Patentability mailed Jan. 12, 2023, from The International Bureau of WIPO, for International Patent Application No. PCT/US2021/039395 (filed Jun. 28, 2021), 11 pgs.
International Search Report and Written Opinion mailed Mar. 5, 2019, from the ISA/US, for International Application No. PCT/US18/62767 (filed Nov. 28, 2018), 15 pages.
International Search Report and Written Opinion mailed May 13, 2020, from the ISA/European Patent Office, for International Application No. PCT/US2019/063717 (filed Nov. 27, 2019), 16 pgs.
International Search Report and Written Opinion mailed Apr. 20, 2022, from the ISA/European Patent Office, for International Patent Application No. PCT/US2022/012746 (filed Jan. 18, 2022), 15 pgs.
International Search Report and Written Opinion mailed Oct. 20, 2021, from the ISA/European Patent Office, for International Application No. PCT/US2021/039395 (filed Jun. 28, 2021), 14 pgs.
International Search Report and Written Opinion mailed Jan. 25, 2022, from the ISA/European Patent Office, for International Application No. PCT/US2021/058209 (filed Nov. 5, 2021), 15 pgs.
International Search Report and Written Opinion mailed Jul. 26, 2022, from the ISA/European Patent Office, for International Patent Application No. PCT/US2022/025324 (filed Apr. 19, 2022), 13 pgs.
Invitation to Pay Additional Fees and Partial Search mailed Mar. 4, 2020, from the ISA/European Patent Office, for International Patent Application No. PCT/US2019/063717 (filed Nov. 27, 2019), 15 pages.
Khoshnam; et al., "Hands-Free EEG-Based Control of a Computer Interface Based on Online Detection of Clenching of Jaw", International Conference on Bioinformatics and Biomedical Engineering, IWBBIO 2017, Part I, Lecture Notes in Computer Science book series (LNCS, vol. 10208), pp. 497-507.
Knapp, R. Benjamin, "Biosignal Processing in Virtual Reality Applications," Cal. State University Northridge Center on Disabilities Virtual Reality Conference 1993 (1993) (available at http://www.csun.edu/~hfdss006/conf/1993/proceedings/BIOSIG~1.htm).
Toto-Klesa, Hella, "Detection of Teeth Grinding and Clenching using Surface Electromyography", Master's thesis, Jul. 29, 2020, Technische Universität München, Munich, Germany, 72 pgs.
Terndrup, Matthew, "Wiggle your nose to control VR experiences with Reach Bionics," Upload VR (Jan. 12, 2016) (Available at https://uploadvr.com/reach-bionics-lets-you-control-vr-experiences-by-wiggling-your-nose/).
Von Rosenberg; et al., "Smart helmet: Monitoring brain, cardiac and respiratory activity," 2015 37th Annual International Conference of the IEEE Engineering in Medicine and Biology Society (EM BC), Milan, 2015, pp. 1829-1832, NPL001 (Year: 2015).
Xu; et al., "Clench Interaction: Novel Biting Input Techniques", Human Factors in Computing Systems Proceedings (CHI 2019), May 4-9, 2019, 12 pages.
Communication pursuant to Article 94(3) EPC dated Apr. 28, 2023, from the European Patent Office, for European Patent Application No. 19827960.6, 7 pgs.
Gu; et al. "Efficacy of biofeedback therapy via a mini wireless device on sleep bruxism contrasted with occlusal splint: a pilot study", Journal of Biomedical Research, 2015, 29(2):160-168.
Office Action dated Apr. 24, 2023, for U.S. Appl. No. 18/146,087, (filed Dec. 23, 2022), 11 pgs.
International Preliminary Report on Patentability mailed Aug. 24, 2023, from The International Bureau of WIPO, for International Patent Application No. PCT/US2022/012746 (filed Jan. 18, 2022), 10 pgs.

\* cited by examiner

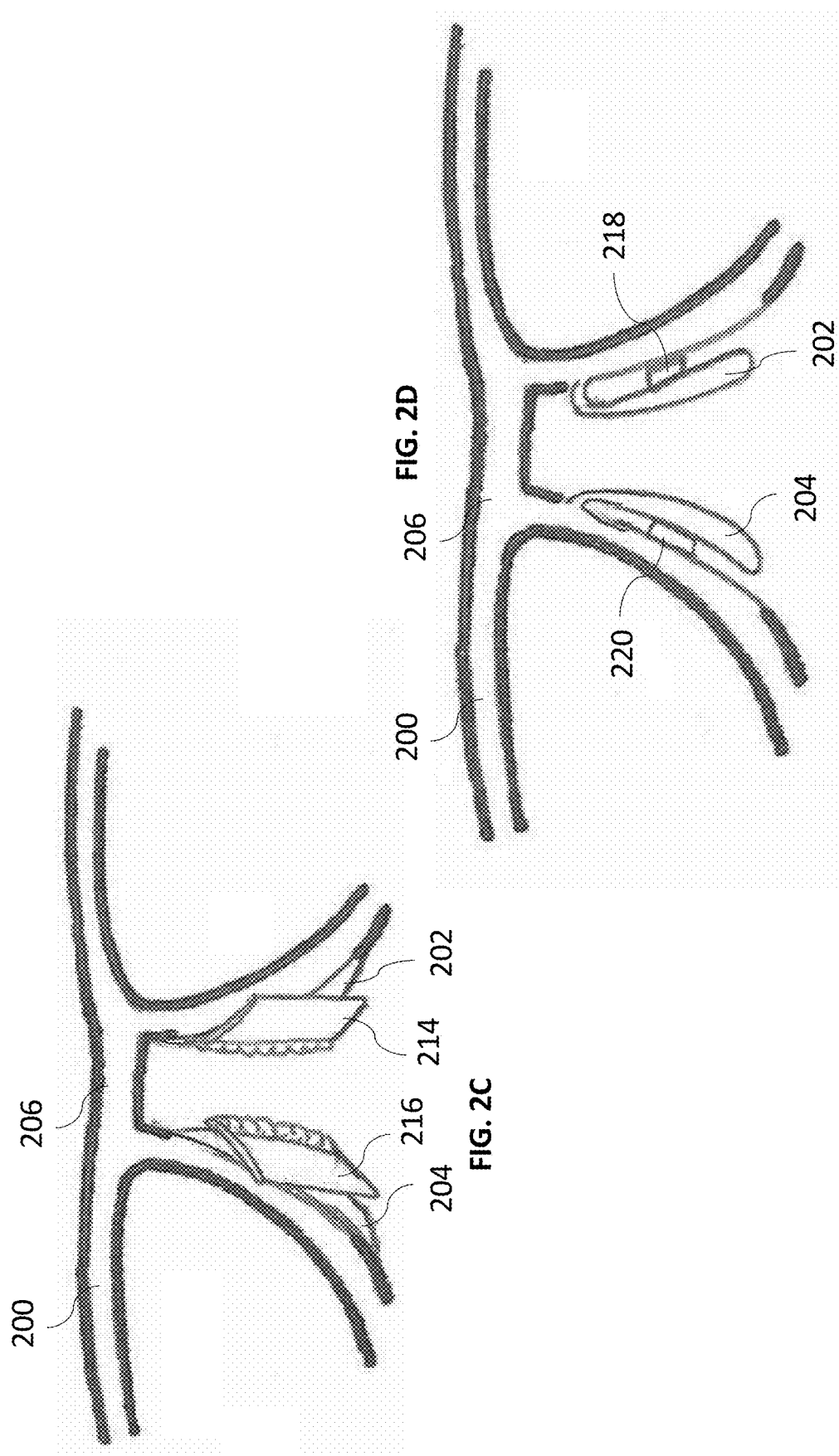

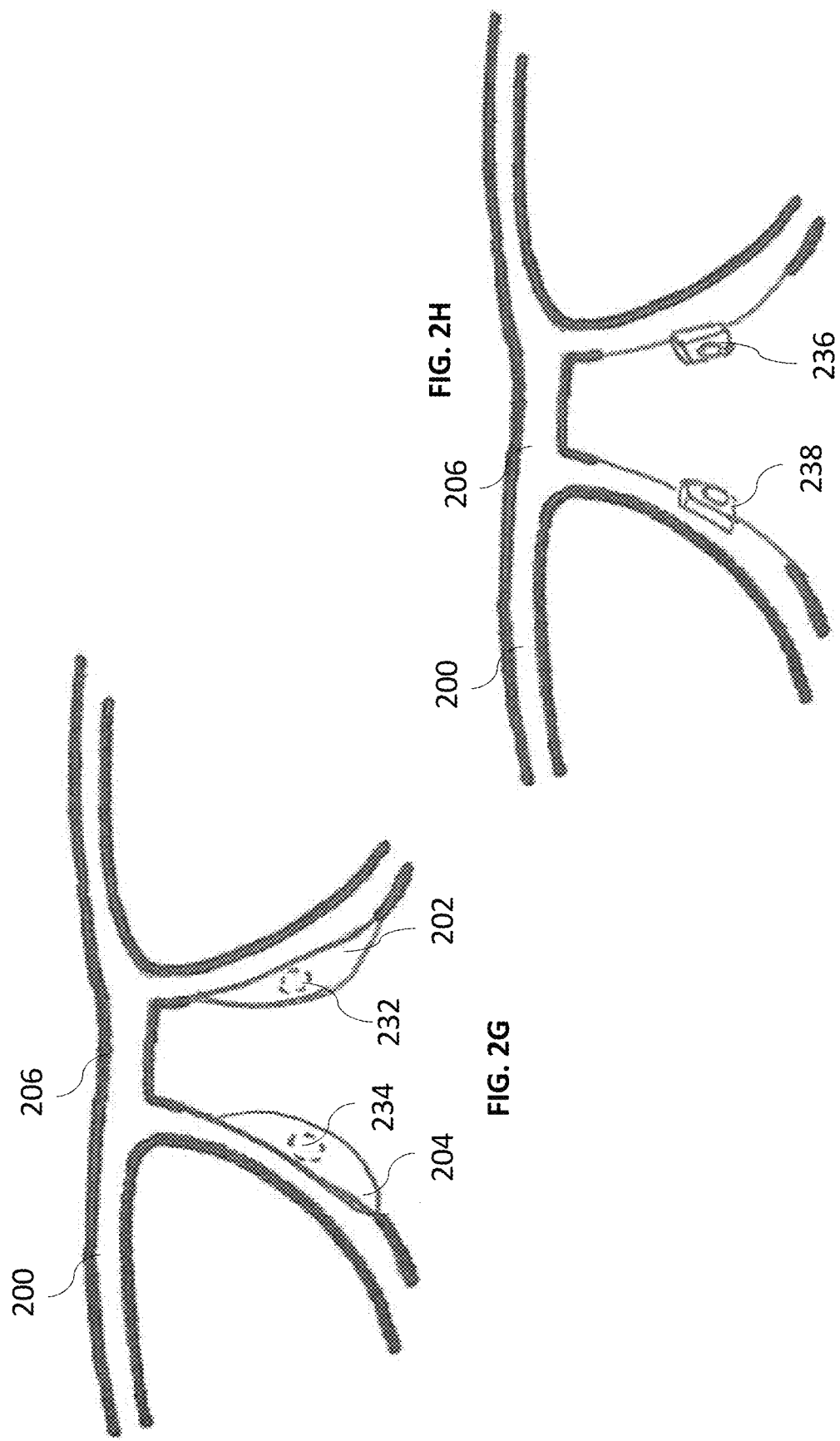

EYEGLASSES NOSE PIECE SWITCH

RELATED APPLICATIONS

This is a NONPROVISIONAL of, claims priority to, and incorporates by reference U.S. Provisional Application No. 63/378,329, filed 4 Oct. 2022.

FIELD OF THE INVENTION

The present invention relates to a nose piece switch for eyeglasses, goggles, visor, mask, headset, and/or other head-worn items and to systems and methods for operating a controlled device in a remote manner using such a switch.

BACKGROUND

The desire for remote operation of controlled devices arises in many contexts. For example, head-worn devices such as surgical and outdoor recreational headlamps, and more advanced systems, such as virtual reality headsets, have used input means such as tactile buttons and switches, touch-activated control surfaces, and gesturing technologies as means of controlling their operation. In some cases, such devices have relied upon touch-or press-activated control elements that are added onto existing wearables. For example, Parshionikar, US PGPUB 2019/0265802, describes sensors that are added to eyewear to monitor touches, eyebrow raises, frowns, nose twitching, motion of the wearer's cheek, and/or blinking/eye closure to control remote devices, detect drowsiness, and/or monitor proper wearing of the eyewear. And, Lundström, EP 1928296 B1, describes a head-mounted device for controlling a remote unit by way of "click" commands, equivalent to mouse clicks, generated in response to sensed movements of a wearer's facial muscles.

A common problem with previous systems that employ sensors such as those discussed above is that they add complexity to the headwear or eyewear in the form of needed mounting locations for the sensors. This often adds bulk to temple pieces or other elements of the headwear/eyewear, and can interfere with the normal wearing thereof. In some cases, certain headwear or eyewear may not be able to support such sensors at all. For example, eyewear with very thin or wire-like temple pieces cannot accommodate sensors while retaining their aesthetic characteristics. The sensors can also be difficult to manipulate depending upon the technology being employed. For example, capacitive touch sensors and other touch- or press-sensitive sensors require that a user make contact with the actual sensor in order for a command to be registered.

SUMMARY

In embodiments of the present invention, eyewear or other head-worn apparatus are fitted with an activation accessory that includes one or more switch elements integrated with or attached to a nose piece of the eyewear. The switch elements are communicably coupled to a processor-based controller so as to provide input signals to the controller responsive to wearer-initiated activations of the switch elements through interaction with a frame or temple piece of the eyewear. Upon receipt, the controller evaluates the input signals to determine whether or not they represent a command for the controlled device by assessing the input signals for a signal pattern indicative of such a command, and then, if the evaluation determines that the input signals do represent the command, issues the command to the controlled device. Otherwise, the controller proceeds to receive and evaluate further input signals from the switch elements in a like manner as the first input signals.

In various embodiments, the switch elements may include compression switches integrated with or attached to the nose piece of the eyewear. Such compression switches may include Hall effect sensors or other forms of sensors. Alternatively, or in addition, the switch elements may include any of: tactile microswitches, piezo switches, pneumatic pressure sensors, force sensors, or strain gauge sensors. In some cases, the switch elements may be configured to detect movement of a flexible portion of the nose piece in comparison to rigid structural components of the eyewear when acted upon by a force and to produce output signals to the processor-based controller responsive thereto. Or, the switch elements may include flexible actuation arms coupled to silicone pads, where movement of the flexible actuation arms causes the output signals to be sent (e.g., by activating a Hall effect or other sensor). Not all actuation arms need necessarily be connected to silicone pads. For example, other instances of actuation arms or actuation elements include living hinge elements and hinged paddles. And, not all sensors need necessarily be Hall effect sensors. For example, microswitches can be used. In some cases, the switch elements may be sealed within watertight membranes. Other forms of moveable actuators include those which may be biased open with respect to a sensor when the switch element is not activated.

These and further embodiments of the invention are described in greater detail below.

BRIEF DESCRIPTION OF THE DRAWINGS

The present invention is illustrated by way of example, and not limitation, in the figures of the accompanying drawings, in which:

FIGS. 2A-2H illustrate various examples of sensor and actuator arrangements for an activation accessory usable with a pair of eyeglasses, according to embodiments of the present invention.

DETAILED DESCRIPTION

Figure 1:
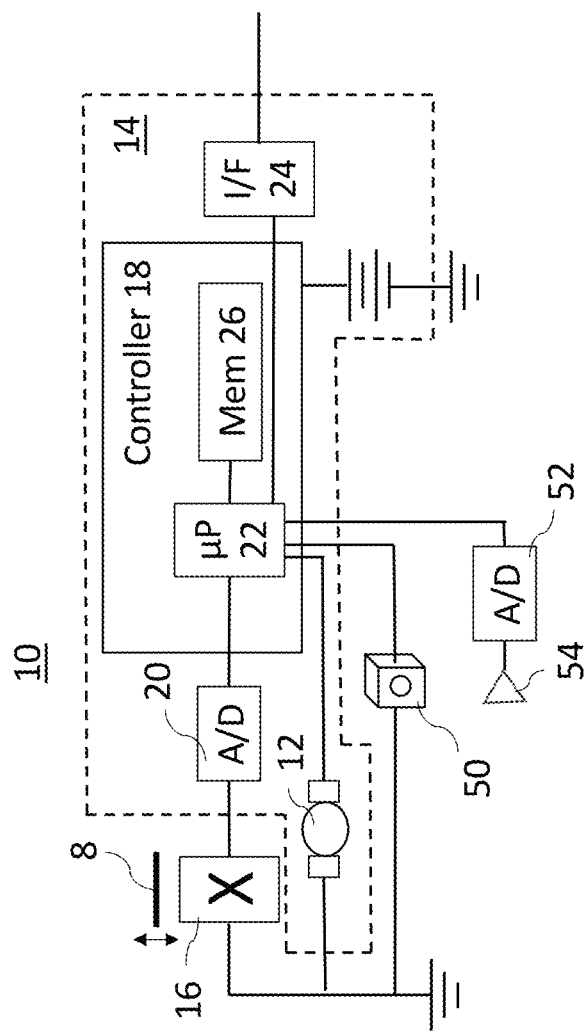
FIG. 1 illustrates schematically an example of an activation accessory for a controlled device, according to one embodiment of the present invention.

Described herein is a nose piece switch or switch element for eyeglasses, goggles, visors, masks, headsets, and/or other head-worn items, and to systems and methods for operating a controlled device in a remote manner using such a switch or switch element. Other embodiments of the invention make use of the switch or switch element as part of other head-worn illumination, imaging, and/or communication systems. For sake of brevity, the configuration, position, operation, and other features of the nose piece switch or switch element will be explained with reference to a pair of eyeglasses, but readers should understand that the present invention is not limited to use with eyeglasses and the switch or switch element may be employed with any head-worn item that includes a nose piece, including augmented reality and/or virtual reality headsets, safety glasses, sunglasses, ski goggles, swimming goggles, masks, respirators, or similar devices.

As will be apparent from the following discussion, the present invention overcomes many of the disadvantages noted above. For example, by including the switch or switch element in the nose piece of a head-worn device, or even incorporating elements of the nose piece as the switch or switch element itself, the present invention avoids the need for locating sensors on other surfaces, such as temple pieces. That is, no changes to the aesthetic characteristics of existing head-worn items are needed to accommodate the present switch or switch element. Further, the present switch or switch element is easy to activate and a wearer need not make contact with the switch or switch element itself. Instead, a wearer may activate a switch or switch element by pressing on a portion of the frame of the head-wear, e.g., on the nose bridge, on a corner or rim of the frame, or other convenient location such as a temple piece. Indeed, different command inputs can be accommodated by such manipulation if switches or switch elements are present in both the right and left portions of a nose piece. For example, pressing a right-side of a frame or the right temple piece may activate a right-side switch or switch element, pressing a left-side of the frame or the left temple piece may activate a left-side switch or switch element, and pressing a nose bridge may activate both the right-side and left-side switches or switch elements. In each case, these different control inputs, as well as press-and-release, press-and-hold (e.g., for a push-to-talk action), double-press, etc., combinations of the above may be used to send different commands inputs for the controlled device. An important advantage of not having to physically touch/press the actual sensor (i.e., the switch or switch element) is that the present invention is well-adapted for use in environments were a wearer's hands may be contaminated by dirt or other matter, or may be encased in gloves, and thus not capable of using/activating capacitive sensors. Activation of the present switch or switch element by means of pressing a portion of the frame of the head-worn device in which the switch or switch element is located avoids contamination of the switch or switch element and/or permits the use of hand coverings such as gloves. And, it should be apparent that single-hand operation of the present switch or switch element, even if more than one is present (e.g., one per nose piece side), is possible, meaning that a wearer can still hold tools or perform other actions with the hand not engaged in activating the switch(es) or switch element(s).

As alluded to above, some embodiments of the invention are characterized, in part, by employing a switch or switch element, e.g., a Hall effect or other sensor, that is positioned near the face of a user, for example, overlying an area of the user's nose, so that pressing on the frame or temple piece of a pair of eyeglasses (e.g., on the frame of the eyeglasses, the nose bridge, either or both of the temple pieces, or another portion of the eyeglasses), whether side to side and/or vertically, for example using one or more fingers, activates or deactivates the switch or switch element. The eyeglasses position the switch(es) or switch element(s) so that it/they overlie the wearer's nose (that is, a portion thereof), thereby allowing for remote operation of a controlled device through activation/deactivation of the switch or switch element.

And, some embodiments of the invention described herein utilize one or more switches or switch elements that are actuated by compressing them between the wearer's head or face and the rigid structural components of the eyeglasses. For example, some embodiments of the present invention rely on a force being applied by the wearer's hand or finger to one or more of the rigid structural components of the eyeglass frame or temple pieces in order to acuate one or more compression switches positioned on or within the nose piece of the eyeglasses. Switch actuation is effected, for example, by the wearer tapping or pressing against the rigid structural components of the eyeglasses, thereby causing the nose piece to be compressed (at least momentarily) against the paired nasal bones of the wearer and/or the soft tissue of the nose. As noted above, by positioning a switch on both the right and left areas of the nose piece, the wearer can provide independent right- and left-hand actuation by directing the force from either the right or left side of the eyeglass frame or temple pieces. Both right and left simultaneous (or nearly so) switch actuation occurs by pressing against the bridge portion of the eyeglass frame, thereby causing both switches to be compressed against the paired nasal bones and/or the soft tissue of the nose. Thus, many different switch actuation patterns can be effected through combinations of actuations of the left, right, and both compression switches. Of course, in some instances, a single nose piece switch may be used.

Although the present invention describes compression switches integrated with or attached to the nose piece of the eyeglasses, these compression switches could be located at other locations on the eyeglasses that allow for a tapping or pressing of a hand or finger against the rigid structural components of the eyeglasses to actuate one or more switches via compression against the wearer's head or face. The compression switches could rely upon Hall effect sensors, tactile microswitches, piezo switches, pneumatic pressure sensors, force sensors, strain gauge sensors, and the like. Beyond utilizing compression sensors, switch actuation could be produced by utilizing sensors that detect movement of a flexible nose piece in comparison to rigid structural components of the eyeglasses when acted upon by a force. Such sensors could include optical sensors, potentiometers, accelerometers, gyros, and the like. Flexible actuation arms could also be used. For example, some nose pieces include silicone pads at the end of metal supports, If the supports are flexible, then they could be employed as a lever or throw of the switch, so that when the nose piece pad is compressed against the wearer's nose, the support flexes and activates a sensor internal to the frame of the eyewear that is positioned, for example, in the rim surrounding one of the lenses and near the nose piece.

In various embodiments of the invention, switches and/or switch elements can be applied directly to the eyeglass frame at locations that contact a wearer's face such as the paired nasal bones, soft tissue of the nose, etc., or could be sealed within a watertight membrane that surrounds the switch or switch element by over-molding "soft touch" flexible elastomers over a portion of the rigid eyeglass frame. Living hinge designs or hinged paddles could also be used to provide actuation of the switch/switch element when the user taps or presses their hand or finger against the eyeglass frame, causing the switch/switch element to be compressed between the paddle and the eyeglass frame. Additionally, or alternatively, a mechanical tactile/haptic response to the switch/switch element being actuated may be provided via a vibration motor that is actuated upon a controller recognizing such actuation. Or, the haptic/tactile response may be provided by the switch or switch element itself, without need for a vibration motor. For example, where a tactile microswitch is employed, a wearer may experience the sensation of switch actuation on his/her nasal bones and/or finger/hand when a dome in which the switch element is contained compresses against the wearer's face.

Reference to a switch or switch element herein is intended to mean one or more components of a switch, which may be a mechanical switch, an electrical switch, an electrotechnical switch, a virtual switch (e.g., one that is implemented in software running on a controller or other form of programmable device), etc. In the case of a virtual switch, the actuation of the switch may be in response to a change in an electrical signal received by a controller from a sensor that results from the tapping or pressing of a hand or finger against the rigid structural components of the eyeglasses. For example, in the case of a piezo switch such a tapping or pressing may cause a variation in an electrical signal from the sensor and that variation may be used as a signal to activate or deactivate the virtual switch. In cases where only a switch or switch element is referred to in the singular, it should be understood that either or both are intended. Activation of a switch or switch element may, in various embodiments, be effected by moving one component thereof relative to one or more other components thereof.

As used herein, when referencing the nose area of a wearer's face, as in a switch or switch element overlying such an area, it means a wearable device, such as a pair of eyeglasses, having one or more surfaces, e.g., control surfaces (e.g., Hall effect sensors, electromyography (EMG) sensors, piezo switches, tape switches, fabric switches, tactile microswitches, pneumatic pressure sensors, force sensors, strain sensors, etc.), positioned to contact the right and/or left side of the wearer's nose, for example on or near an area of the nasal bones. The control surfaces may be switches and/or switch elements, or other control surfaces configured to detect a relaxed condition and a compressed, flexed, or displaced condition, thereby allowing the wearer to generate input signals for controlling electronic system components via touching or pressing on a portion of the rigid eyeglass frames. Other elements of the controller may be included in a module attached to or included in other areas of the eyeglasses, such as the bridge or temple piece(s) or worn or carried on another part of the wearer's person. The module may also be constructed to house one or more of the electronic system components (e.g., lights, cameras, displays, laser pointers, a haptic engine in the form of a vibration motor, etc.) that is (are) being controlled by the nose piece switch or switch element.

Referring to FIG. 1, an example of an activation accessory 10 for a controlled device is shown. The activation accessory 10 includes a module 14 that includes an optional vibration motor 12 and a controller 18. In some embodiments, when it is present the vibration motor 12 need not be included in module 14. Activation accessory 10 also include a sensor 16, which may or may not include a moveable actuator 8, that is communicably coupled to controller 18 through an analog-to-digital (A/D) converter 20, which converts the analog output of the sensor 16 to a digital signal that is provided as an input to a processor 22 of the controller 18. In some cases, an A/D converter 20 will not be needed, e.g., where the output of the sensor 16 is already digitized, or it may be incorporated within controller 18. Processor 22, in turn, has outputs coupled to a control signal interface 24 and the vibration motor 12.

Moveable actuator 8, where present, is a lever arm that is biased open with respect to sensor 16 so as to be extended or open when the activation element is not being worn or when it is being worn but the wearer is not tapping or pressing on the eyeglasses. In various embodiments, the moveable actuator 8 may be an over molded elastomer member that is supported on a pliable gasket or similar joint and the sensor 16 produces an output signal responsive to movements of the moveable actuator 8 towards and/or away from the sensor. In other instances, the moveable actuator 8 may be a post on which a silicone nose pad of a pair of eyeglasses (or similar) is positioned. The moveable actuator 8 may be biased in an open position with respect to sensor 16 by one or more springs, a living hinge, or another arrangement. When acted on by a force, such as the wearer pressing on the eyeglasses frame and/or temple piece(s), the moveable actuator 8 moves with respect to the sensor 16, resulting in sensor 16 producing an output signal. The sensor 16 may be force-sensitive so that the magnitude of the output signal is responsive to the pressure exerted upon it; thus, an initial pressure due to a wearer donning the eyeglasses may cause the sensor 16 to output a signal of a magnitude indicative of a wake signal, while subsequent pressures due to touch/press actions of the wearer may cause the moveable actuator 8 to further compress with respect to the sensor 16, resulting in greater pressure sensed by sensor 16 and causing sensor 16 to output signals of a magnitude indicative of control inputs for a controlled device.

Figure 2A:
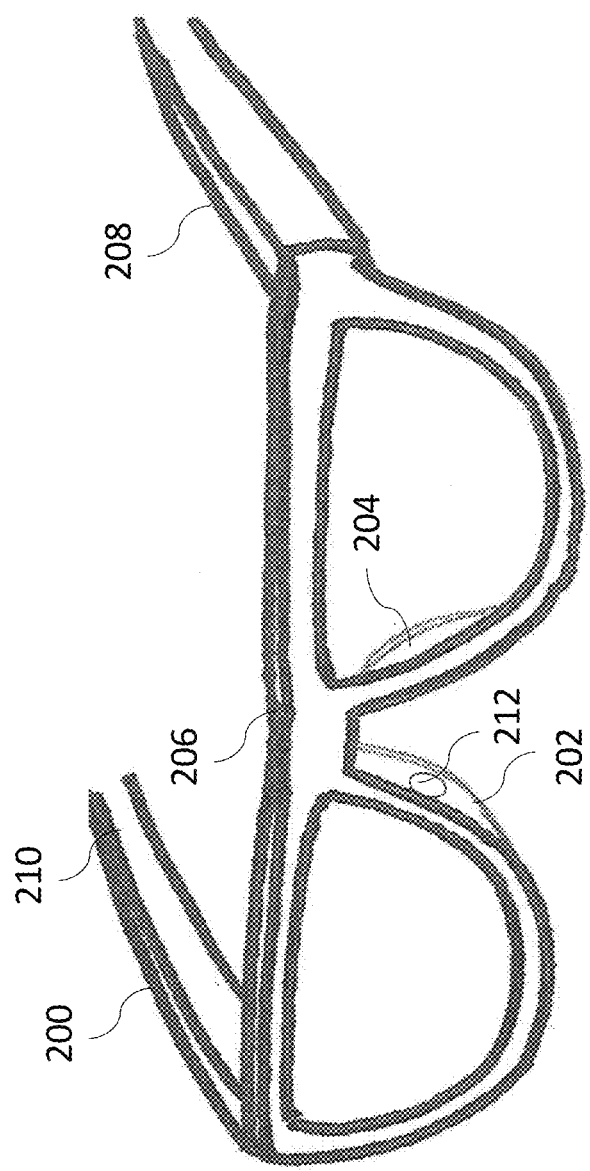
Figure 2B:
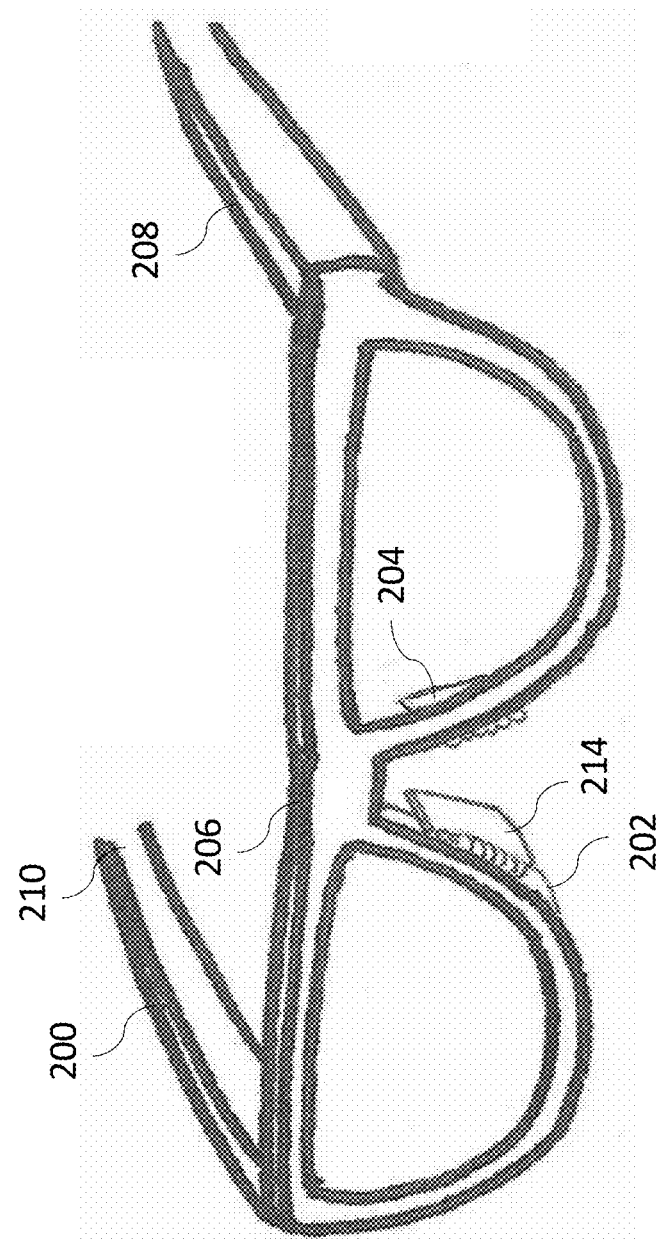
Figure 2E:
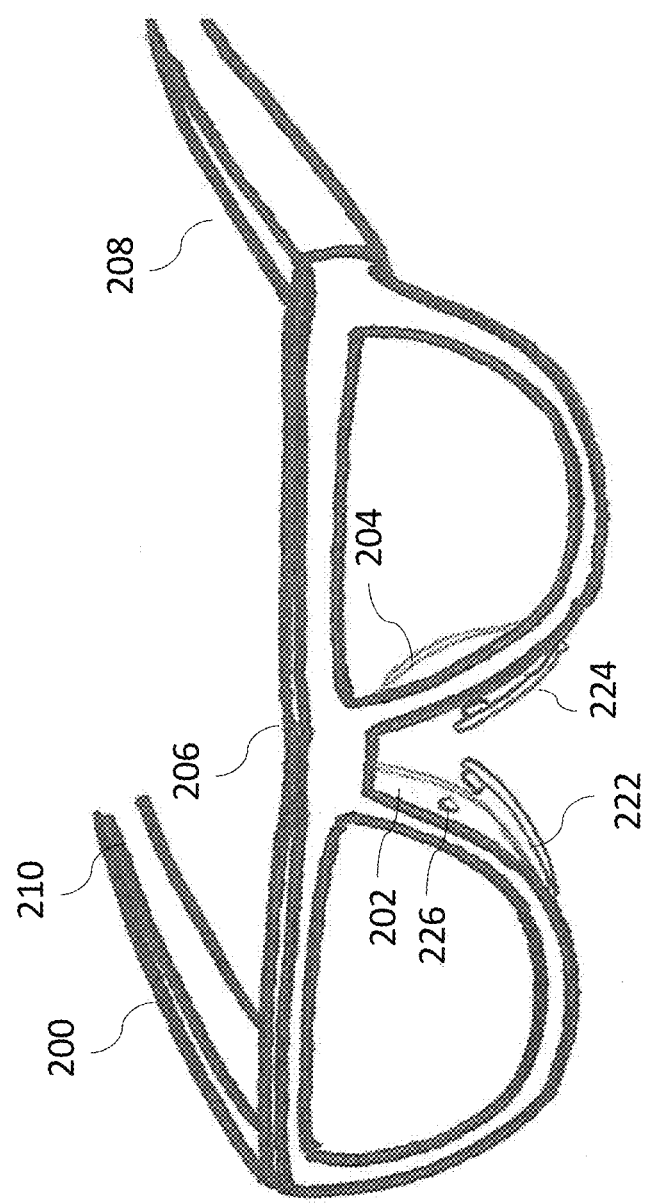
Figure 2F:
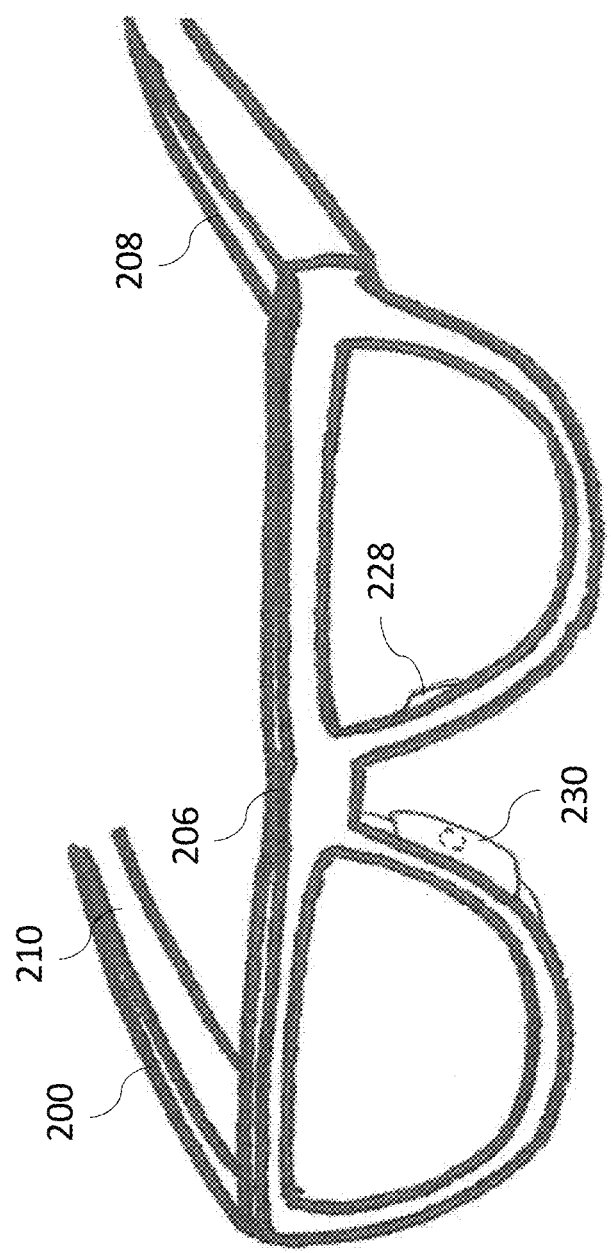

FIGS. 2A-2H illustrate various examples of sensor and actuator arrangements for a pair of eyeglasses 200. In FIG. 2A, eyeglasses 200 include left and right nose pieces 202, 204. Other forms of eyeglasses may include a nose piece of unit construction. Eyeglasses 200 also include a bridge 206 and temple pieces 208, 210. In FIG. 2A, the sensor 16 is a compression switch 212 included on nose piece 202. A similar compression switch may or may not be included on nose piece 204. In FIG. 2B, sensor 16 is a hinged paddle switch 214 included on nose piece 202. A similar hinged paddle switch may or may not be included on nose piece 204. FIG. 2C, shows a view of eyeglasses 200 from the interior side, with hinged paddle switch 214 positioned on nose piece 202 and hinged paddle switch 216 positioned on nose piece 204. FIG. 2D also shows a view of eyeglasses 200 from the interior side. This time, sensors 16 are in the form of compression switches 218, 220, and the nose pieces 202, 204 are living hinges attached to eyeglasses 200. When the living hinge nose pieces compress, they activate the compression switches 218, 220. FIG. 2E shows eyeglasses 200 with flexible activation switches. Moveable actuators 222, 224 are attached to nose pieces 202, 204, respectively, and each is associated with a respective sensor 226. When the user touches or presses on eyeglasses 200, the moveable actuators 222, 224 are compressed towards their respective sensor 226 in the nose piece, causing the sensor to emit an output signal. FIG. 2F shows an example of eyeglasses 200 with an over-molded nose piece 228. Respective left and right sensors 230 may be attached to or embedded within the over-molded nose piece and may emit output signals in response to compression. FIG. 2G shows an example where separate over-molded nose pieces 202, 204 each include a respective compression sensor 232, 234. FIG. 2H shows an example where exposed tactile switches 236, 238 are mounted to eyeglasses 200 in the area where a nose piece is usually found.

As mentioned, a Hall effect sensor is but one example of a sensor 16 that may be used in connection with activation accessory 10 and in other embodiments one or more such sensors, which may or may not be Hall effect sensors, may be used. Generally, sensor 16 is a component of one or more compression switches that are actuated by compressing them between the wearer's nose and the rigid structural components of the eyeglasses. Instead of Hall effect sensors, sensors 16 could be tactile microswitches, piezo switches, pneumatic pressure sensors, force sensors, strain gauge sensors, and the like. Beyond utilizing compression sensors, switch actuation could be produced by utilizing sensors that detect movement of a flexible nose piece in comparison to rigid structural components of the eyeglasses when acted upon by a force. Such sensors could include optical sensors, potentiometers, accelerometers, gyros, and the like. Flexible actuation arms could also be used.

Returning to FIG. 1, the processor 22 of controller 18 is also coupled to a memory 26, which stores processor-executable instructions that, when executed by processor 22, cause processor 22 to receive and evaluate input signals from the sensor 16. Controller 18 (i.e., processor 22) evaluates the input signals to determine whether or not they represent a command for a controlled device by assessing the input signals for a signal pattern indicative of such a command. As more fully discussed below, if/when the processor 22 determines that the input signals from sensor 16 represent a command for the controlled device, then processor 22 decodes the command and transmits an associated control signal to the controlled device via the control signal interface 24, as well as transmitting an activation signal to the vibration motor 12 if it is present. On the other hand, if the processor 22 determines that the input signals from sensor 16 do not represent the command for the controlled device, no control signal or activation signal is transmitted and processor 22 proceeds to evaluate further/new input signals from the sensor 16 in a like manner as the original input signals. In one embodiment, the activation signal for the vibration motor 12 is a pulse width modulated signal. The haptic feedback provided by vibration motor 12 may also be activated by another user or application (e.g., through a communication to the wearer of the eyeglasses) to provide a means for silent communication. For example, an incoming phone call associated with a mobile phone paired to the activation accessory may by indicated by activation of the vibration motor 12. A subsequent click command through activation of the sensor 16 (e.g., by tapping or pressing the frame of the eyeglasses) could be decoded by processor 22 as a command to answer the call.

Optionally, a microphone 54 and A/D converter 52 are provided as components of activation accessory 10. Microphone 54 detects audible sounds, for example speech by the wearer of activation accessory 10, and produces an analog output in response to those sounds. The analog output is digitized by A/D converter 52 and provided as an input to processor 22. For example, processor 22 may periodically sample the output of A/D converter 52 and process the signal so output to determine if any wearer's speech is being detected by microphone 54. Appropriate filters may be employed to distinguish the wearer's speech from that of others and/or ambient noise. For example, since the wearer's speech would be expected to be louder than that of any others nearby, a threshold filter could be employed to distinguish the wearer's speech from that of others. Also, speech versus noise could be distinguished based on spectral content and/or other parameters. Thus, speech may be used as an alternative means of controlling the controlled device.

Figure 3:
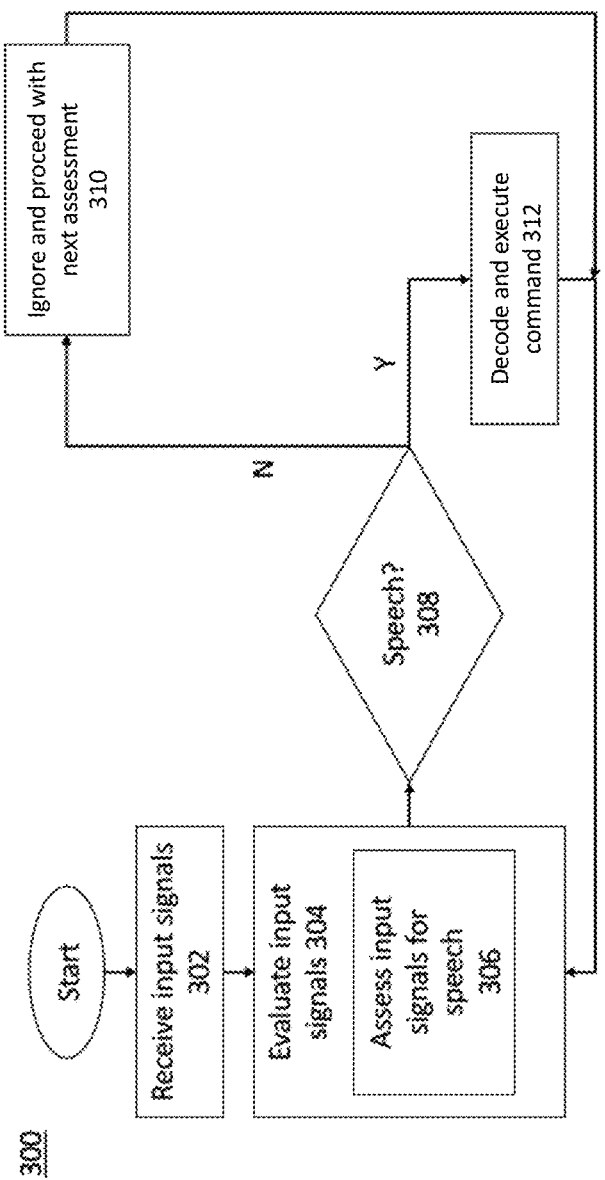
FIG. 3 illustrates a method of distinguishing wearer speech from volitional control indications in accordance with an embodiment of the invention

FIG. 3 illustrates a method 300 of distinguishing wearer speech in accordance with an embodiment of the invention. At 302, the controller 18 receives input signals from the microphone 54 in the wearable module via the A/D converter 52. At 304, processor 22 of controller 18 evaluates the microphone input signals according to and by executing processor-executable instructions stored in memory 26 to determine whether or not the input signals represent speech of the wearer. As discussed above, this evaluation proceeds by the processor assessing 306 the input signals for signal patterns, amplitudes, and or other indications suggestive of wearer speech or other vocalizations. If processor 22 determines that the input signals are not indicative of wearer speech, step 308, then processor 22 proceeds with further assessments 310, otherwise, step 312, if processor 22 determines that the input signals are indicative of wearer speech the processor decodes and executes the command. Such decoding operations are discussed further below.

Additionally, or alternatively, detection of a wearer's vocal cord activation when forming speech may be detected by tuned vibration sensors housed within a head-worn device associated with activation accessory 10 and/or by applying remote vibration sensors to the wearer's neck, jaw, or other location via wired or wireless connections. A blanking or false signal rejection method similar to that shown in FIG. 3 and described above may be employed for inputs provided by such sensors in order to reduce or eliminate false input commands.

Beyond speech detection, embodiments of the invention may further provide speech recognition and/or voice recognition. Speech recognition involves, generally, the recognition and translation of spoken words. Various methods of speech recognition are known in the art, and many modern techniques employ Hidden Markov Models: statistical models that output sequences of symbols or quantities based on input speech signals. The speech signal, e.g., as provided by microphone 54, may be sampled by the controller and the samples applied as inputs to a Hidden Markov Model process running on the controller to produce an output sequence of vectors. These vectors are then used to identify associated phonemes, and the phonemes used to identify the most likely spoken words. Such systems can thus be used to interpret spoken commands for controlled devices.

Voice recognition, on the other hand, generally relates to speaker identification and may or may not include recognition of actual words that are spoken. In embodiments of the present invention, voice recognition may be employed to identify a user prior to executing and/or accepting commands made by the user. Voice recognition may likewise include the controller sampling speech signals from microphone 54 and then using one or more pattern matching and/or other techniques to identify, with a specified probability, the identity of the speaker. If the speaker is confirmed, to a sufficient degree of likelihood, to be an authorized user of the activation accessory, the controller may permit execution of commands input by the user.

Referring now to FIGS. 4A-4F, various examples of controlled devices and arrangements for communicatively coupling same to the wearable module 14 are shown. In FIG.

4A, the controlled device is an illumination element 30 made up of one or more LEDs 32. As indicated above, the processor of controller 18 is coupled to the control signal interface 24 and is adapted to transmit a control signal to the controlled device, in this case illumination element 30, via the control signal interface 24. Not shown in the illustration are drivers and other interface elements that may be present to amplify and/or otherwise condition the control signal so that it is suitable for use with the illumination element 30.

Figure 4:
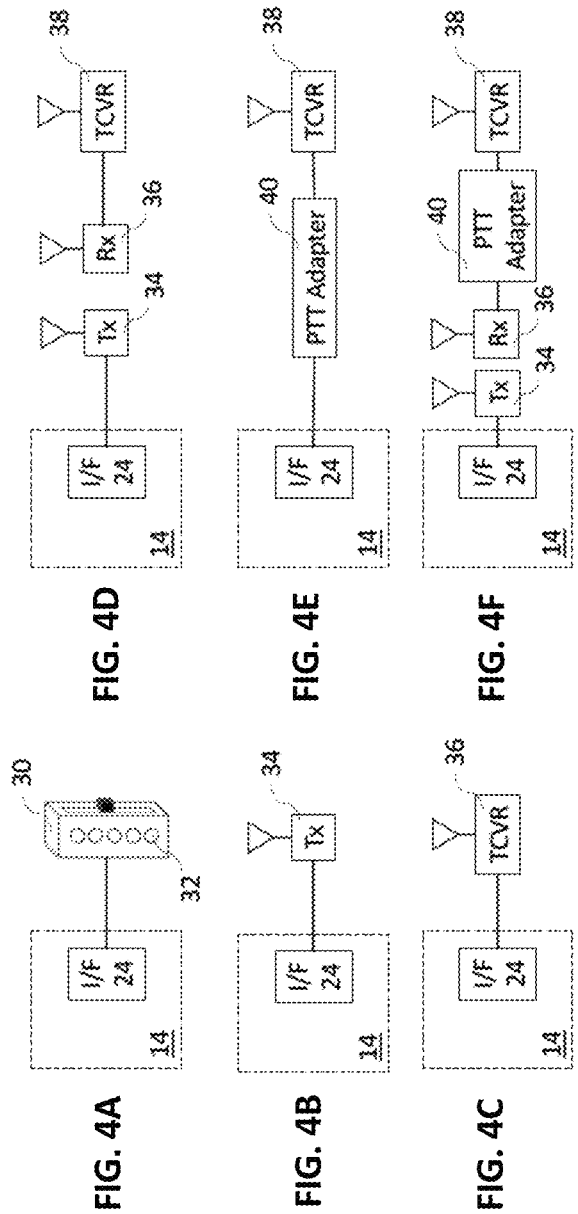
FIGS. 4A-4F illustrate various examples of controlled devices and arrangements for communicatively coupling same to an activation accessory, according to embodiments of the present invention.

FIG. 4B illustrates an example in which the wearable module 14 is coupled to a transmitter 34 via the control signal interface 24. Transmitter 34 may be a low power/short range transmitter, such as a Bluetooth™, Bluetooth Low Energy (BLE), Zigbee, infrared, WiFi HaLow (IEEE 802.22h) or other WiFi, Z-wave, Thread, SigFox, Dash7, or other transmitter. The transmitter 34 may itself be the controlled device or, alternatively, as shown in FIG. 4D, the transmitter 34 may be one component of a wireless communication system that includes a receiver 36 communicatively coupled to a controlled device, such as two-way radio 38. In such an arrangement, transmitter 34 is adapted for radio frequency communication with receiver 36 at the controlled device. Thus, the control signal issued by processor 22 of controller 18 is coupled to the control signal interface 24 and transmitted via a radio frequency signal from transmitter 34 to the controlled device.

FIG. 4C shows a further alternative in which the wearable module 14 is coupled directly to two-way radio 36. In this example, the control signal interface 24 may be coupled to the two-way radio 36 by a cable having a plug configured to mate with a jack at the two-way radio 36 (or, more generally, the controlled device). As such, the wearable module 14 may function as a push-to-talk (PTT) unit for the two-way radio 36 (or, more generally, an activation switch for the controlled device). Or, as shown in FIGS. 4E and 4F, the wearable module 14 may function as an ancillary PTT element for a PTT adapter 40 for the two-way radio 36 (or, more generally, the controlled device). The connection between the wearable module 14 (control signal interface 24) and the PTT adapter 40 may be wired, as shown in FIG. 4E, e.g., using a cable having a plug configured to mate with a jack at the PTT adapter, or wireless, using a transmitter/receiver pair 34, 36. Of course, other arrangements for communicating the control signal produced by the processor 22 (or, more generally, controller 18) of the wearable module 10 to a controlled device may be used.

In addition to the above-described examples, the processor 22 may also communicate with and control other peripherals, such as a heads-up display, audio input/output unit, off-headset unit, etc. Processor 22 is a hardware-implemented module and may be a general-purpose processor, or dedicated circuitry or logic, such as a field programmable gate array (FPGA) or an application-specific integrated circuit (ASIC)), or other form of processing unit. Memory 26 may be a readable/writeable memory, such as an electrically erasable programable read-only memory, or other storage device.

In addition to eyeglasses, the sensors 16 may be supported in a mount of a headset, or another arrangement. For example, such a mount may be moveable with respect to a frame of the headset or a component thereof, so as to permit locating the sensors 16 at different positions on the wearer. More generally, such a mount may be configured to position the sensors 16 so as to be overlying an area of the wearer's nose.

In some cases, the sensors 16 may be supported in a mask (e.g., a mask used by a firefighter, a diver, an aircrew member, of another wearer), where the mask is configured to position the sensors 16 so as to be overlying an area of the wearer's nose.

The activation accessory 10 may include more than one sensor 16, with the multiple sensors arranged with respect to one another so as to permit individual and/or group activation thereof by associated touch/press motions of the wearer.

Further, as shown in FIG. 1, a visual activation indicator 50 may be present. Such a visual activation indicator, e.g., one or more LEDs, may be coupled to receive a visual activation indication signal from the controller 18 (processor 22) and the processor-executable instructions stored in memory 26, when executed by processor 22, may further cause processor 22 to transmit the visual activation indication signal to the visual activation indicator 50 so as to illuminate the one or more LEDs for a brief period of time if/when the processor 22 determines that the input signals from the sensor 16 represent a command for the controlled device or a signal from the controlled device. For example, an incoming phone call from a paired mobile phone may be indicated by controller 18 activating indicator 50. The visual activation indicator 50 may be located on the eyeglasses, e.g., on the temple pieces thereof. An activation indicator of this kind is especially useful when the activation accessory is used to control devices such as PTT controllers/adapters associated with tactical radios or the radios themselves. When providing microphone actuation when using such radios, a "microphone status LED" may be included in visual activation indicator 50 to provide a visual awareness of microphone condition. This LED emits light inside of the eyeglasses which is visible only by the wearer. This provides effective light discipline in the tactical situations. Light would be visible when the microphone is in use (i.e., open) and would be extinguished when the microphone is not in use (i.e., off).

As discussed above, in various embodiments sensor 16 is positioned so as to be flush against the wearer's face (or nearly so), so that touching/pressing or other displacement of the eyeglasses activates the sensor 16 to emit a signal to the processor 22. Power supply and control electronics for the wearable module 14 may be incorporated within the module itself, and/or in other areas of the eyeglasses.

Figure 5:
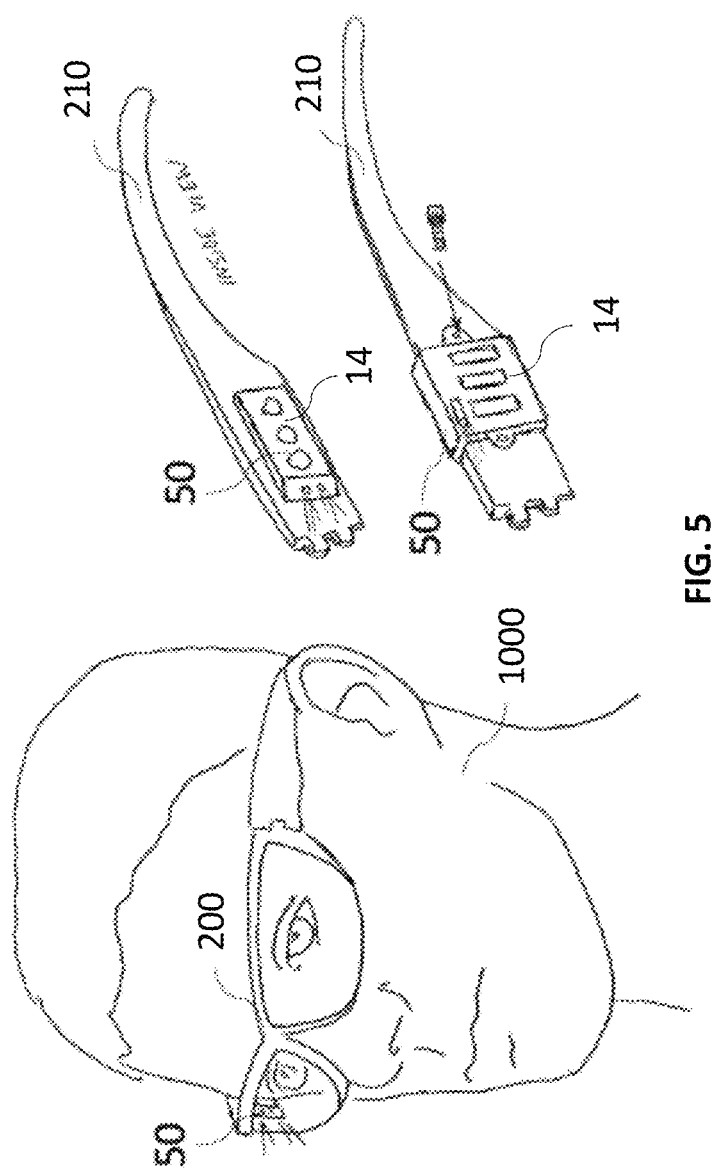
FIG. 5 shows examples of how an illumination element can be attached to the inside of eyeglass temples or slipped over a temple piece to contact a wearer's temple area when eyeglasses including an activation accessory configured in accordance with an embodiment of the present invention are worn.

As shown in FIG. 5, illumination element 50 can be attached to the inside of eyeglass temples 210 or slipped over a temple piece to contact the wearer's temple area when the eyeglasses are worn. This also provides a convenient location for vibration motor 12 (not shown). From this position on the user 1000, when the processor of wearable module 14 detects activation of a sensor 16, which is then turned into a command signal, for activating, deactivating, or controlling a controlled device (e.g., changing the volume of audio communications or music, turning on integrated lighting modules, or answering a phone call, the vibration motor 12 may be activated to provide feedback that indicates successful recognition of the input command.

Further, additional sensors such as for wearer vital signs monitoring may also be integrated into the temple 210 to provide remote biomonitoring of the wearer, as the temple area has been proven to be an effective location for sensing certain vital signs. Such sensors may be integrated into the eyeglass temples 210, permanently attached as an accessory, or attached to the inside of the temple using adhesive tape, glue, magnets, hook and loop fasteners, screws, or a tongue and groove or dovetail profile connection mechanism. The sensor signal may be routed through a powered cable/tether or via a wireless connection such as Bluetooth or Near Field Magnetic Induction.

When assessing the input signals from the sensor(s) 16 for a signal pattern indicative of a command, the processor 22 may evaluate the input signals against a stored library of command signal representations, where each command signal representation characterizes an associated command for the controlled device. Or, in the case of Hall effect sensors in particular, the input signals may be assessed according to count values of the Hall effect sensor(s) received within a specified time period. Still further, the input signals may be evaluated against a trained model of command signal representations, where each command signal representation characterizes an associated command for the controlled device.

Figure 6:
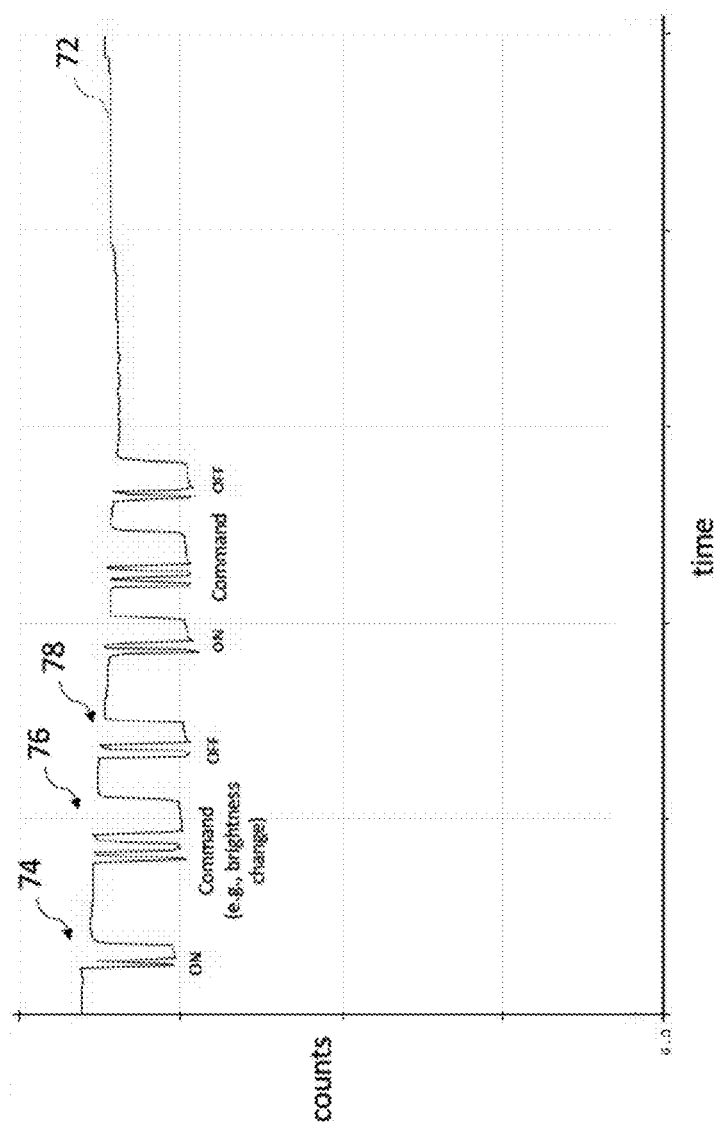
FIG. 6 illustrates an example of an input signal received by processor from a sensor of an activation accessory, according to an embodiment of the present invention.

An example of an input signal received by processor 22 from sensor 16 is illustrated in FIG. 6. Trace 72 depicts "counts" of the Hall effect sensor 16 received by processor 22 over time. In this context, the counts, represent the applied magnetic field detected by the Hall effect sensor 16 which varies with the touch/press actions of the wearer. Other output parameters of Hall effect or other sensors that can be measured to provide similar results include measures of voltages and/or currents output by sensors. More generally, in embodiments of the present invention the activation accessory 10 includes one or more switches and/or switch elements (e.g., Hall effect sensor(s) or other(s) of the sensors discussed herein) that is/are sensitive to touch/press actions of a wearer and which are communicatively coupled to controller 18 having processor 22 and memory 26 coupled thereto and storing processor-executable instructions. Processor 22 is further coupled to provide an output signal to an indicator, such as illumination element 50 and/or vibration motor 12. The processor-executable instructions stored in memory 26, when executed by processor 22, cause the processor to receive input signals from the one or more switch elements, detect relaxed (signal level high in FIG. 6) and pressed (signal level low) conditions of the eyeglasses, e.g., by level or edge detection of the input signals. From these input signals, processor 22 decodes the relaxed and pressed conditions as commands (74, 76, 78, etc.) for controlling electronic system components communicatively coupled to the controller and, optionally, alerts the wearer to successful decoding of the commands by providing the output signal to the indicator.

As illustrated in FIG. 6, trace 72 exhibits marked shifts in count values corresponding to periods of time when a wearer is not touching/pressing the eyeglasses (signal level high) and when a wearer is touching/pressing the eyeglasses (signal level low. The detection of such actions by processor 22 may be edge-sensitive or level-sensitive. Further, as indicated above, the sensor signals may be decoded to discriminate between activation, deactivation, and operational commands for the controlled device. The example shown in FIG. 9 represents decoded signals representing commands for an illumination unit. Signal groups 74 and 78, a short touch followed by a long touch, represent activation ("on") and deactivation ("off") commands. That is, the illumination module is ordered to change operating state, from a current state on or off to an opposite state off or on, respectively, when such a set of input signals is recognized by the processor 22. Signal group 76 represents a command to alter an output characteristic, e.g., brightness, and corresponds to two short presses followed by a long press. The two short presses signal a change in output and the long press signals that the brightness of the illumination unit should be varied, e.g., low to high, during the period of the pressing action. Of course, other command sequences for a variety of controlled devices and sensor arrangements may be implemented. For example, in addition to double press inputs signaling a following command input, triple press inputs may be recognized as signaling valid command inputs, different from commands associated with a double press input. Further multiple press inputs and/or press-and-hold inputs may also be recognized as signifying different commands. Such multi-press inputs are useful for eliminating unintentional actuations of sensor 16, as may be occasioned by involuntary muscle movements or by a wearer chewing food, gum, etc., or the eyeglasses moving during other activities. Generally, the intended command may be identified by decoding the detected relaxed and touched/pressed conditions of the eyeglasses according to a language that identifies such commands according to a number of detected touch/press actions identified within a time period, for example, a number of detected short and long (e.g., press-and-hold) actions identified within a time period. Valid forms of touch/press inputs may be used to turn on/off lighting elements and/or individual LEDs thereof, adjust the intensity of one or more illuminated LEDs, or to signal other desired operations (such as varying the focal length of adjustable focal length eyeglass lenses). In general, touch/press input actuation sequence timings, repetitions, and durations may each be used, individually and/or in combination to specify different command inputs for one or more controlled devices.

Figure 7:
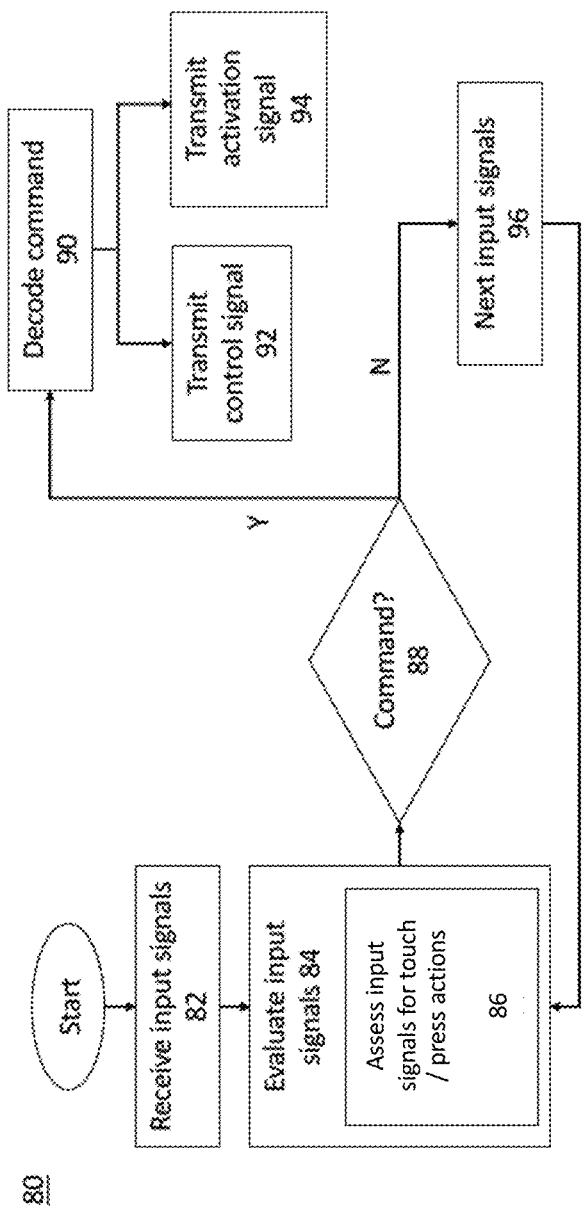
FIG. 7 illustrates a method of operating a controlled device using an activation accessory in accordance with embodiments of the present invention.

FIG. 7 illustrates a method 80 of operating a controlled device in accordance with embodiments of the present invention. At 82, the controller 18 receives from the sensor 16 first input signals. At 84, processor 22 of controller 18 evaluates the first input signals according to and by executing processor-executable instructions stored in memory 26 to determine whether or not the first input signals represent a command for the controlled device. As discussed above, this evaluation 84 proceeds by the processor assessing 86 the first input signals for a signal pattern indicative of a plurality of touch/press actions of a wearer of the eyeglasses. If processor 22 determines that the first input signals represent the command, step 88, then processor 22 decodes the command 90, e.g., by identifying the input signals as being one of a number of patterns of a language, as described above, and transmitting 92 an associated control signal to the controlled device via a communication element communicably coupled to the processor, and, optionally, transmitting 94 an activation signal to a vibration motor and/or visible indicator of the wearable module. Decoding the command signal may involve determining the number of short touch/press actions preceding a long touch/press action to determine the nature of a following one or more long and/or short touch/press actions, and may also depend on a current operating state of the controlled device. Otherwise, step 96, the processor 22 does not transmit the control signal and the activation signal and instead proceeds to evaluate second/next input signals 96 from the sensor in a like manner as the first input signals.

In some embodiments, sensor 16 is a device that requires little or no mechanical displacement of a control element in order to signal or effect a change (or desired change) in state of a controlled system. One example of such a device is a Hall effect sensor. Other examples of such a device include a piezo switch, such as the Piezo Proximity Sensor produced by Communicate AT Pty Ltd. of Dee Why, Australia, a tape switch, a fabric switch, or other switch that requires little or no mechanical displacement of a control element. Piezo switches generally have an on/off output state responsive to electrical pulses generated by a piezoelectric element. The electrical pulse is produced when the piezoelectric element is placed under stress, for example as a result of compressive forces resulting from a wearer clenching his/her jaw so that pressure is exerted against the switch. Although the pulse is produced only when the compressive force is present, additional circuitry may be provided so that the output state of the switch is maintained in either an "on" or an "off" state until a second actuation of the switch occurs. For example, a flip-flop may be used to maintain a switch output logic high or logic low, with state changes occurring as a result of sequential input pulses from the piezoelectric element. One advantage of such a piezo switch is that there are no moving parts and the entire switch can be sealed against the environment, making it especially useful for marine and/or outdoor applications.

Another example is a micro tactile switch. Although tactile switches employ mechanical elements subject to wear, for some applications they may be more appropriate than Hall effect sensors or piezo switches because they provide mechanical feedback to the user. This feedback can provide assurance that the switch has been activated or deactivated. Momentary contact tactile switches may also be used, but because they require continual force, they are best suited to applications where only a momentary or short engagement of the active element under the control of switch is desired, for example, signal light flashes, burst transmissions, or other short duration applications, or where a flip flop is used to maintain an output state until a subsequent input is received, as discussed above. Other forms of switches include a ribbon switch (e.g., as made by Tapeswitch Corporation of Farmingdale, NY) and conductive printed circuit board surface elements activated via carbon pucks on an overlaid keypad.

Further, in various embodiments, the controlled device may consist of one or more LEDs, which emit light in one or more wavelengths. Further, the controlled device may include one or more cameras for digital still and/or video imaging. In some instances, a lighting element may be worn on one side of the eyeglasses while an imaging system is worn on the opposite side, each being controlled by separate sensors mounted on respective nose pieces, or by the activation accessory if the lighting and illumination systems are responsive to different command signals, similar to the way in which computer cursor control devices (e.g., touch pads, mice, etc.) may be separately responsive to single, double, triple, or other multiple clicks. Indeed, the activation accessory may itself be used to control a cursor as part of a user-computer interface. For example, any or all of cursor type, cursor movement, and cursor selection may be controlled using activation accessory 10. Applications for such uses include computer gaming interfaces, which today commonly include head-worn communication equipment. One or more wearable modules 14 configured in accordance with embodiments of the invention may be fitted to a single pair of eyeglasses (either when manufactured or as an aftermarket addition) to provide any or all of the capabilities discussed herein. Conventional wired or wireless communication means may be employed to provide a connection to a console, personal computer, tablet, mobile phone, or other device that serves as the gaming or other host.

One or more of the above-described embodiments may permit signal generation via a control surface that can be activated by direct or indirect force, hinged paddle, touch-sensitive surface, or other tactile actuation device. Devices configured in accordance with these embodiments may employ moveable structures (e.g., paddles) that house sensors to detect a change in an electromagnetic field when a corresponding magnet is moved in proximity to the sensor. Such devices may be in the form of an accessory to a remote (e.g., hand-held) device or fully integrated into a wearable form factor such as eyeglasses. Other sensors, as discussed herein, may also be used.

By providing both a left and right activation means (or any number of them) which may be configured to allow for input of various kinds (e.g., different numbers of activations similar to single-, double- or other mouse clicks), a user may provide different commands for an associated device. For example, different command activation sequences may be used for zooming a camera, panning a direction in a virtual/visual environment, or a host of other commands to control cameras, audio transmissions (volume up or down), etc. And, in connection with cursor control actions of a computer system or similar device (including but not limited to mobile phones, tablets, etc.), command sequences for swiping between views/screens, advancing or repeating tracks (music, video, or audio/video), active windows on a screen, etc. may be accommodated. In addition to the foregoing, the use of gyros and/or accelerometers while pressing and holding can allow for selecting and moving objects in the virtual field. This is similar to a click-and-hold followed by movement of a cursor with a mouse or joystick in that it allows a user to move objects (e.g., icons) around on a virtual desktop, to open menus, and to select commands, etc. by pressing and moving one's head. The gyros and/or accelerometers may be incorporated in wearable module 14 or elsewhere (e.g., in an eyeglass frame supporting the wearable module).

In addition to or as an alternative to gyros and/or accelerometers embodiments of the present invention, whether instantiated as head-worn devices, augmented reality/virtual reality headsets, or others, may employ the present systems and methods for operating a controlled device in a remote manner, and in particular an activation accessory for a controlled device that includes a sensor configured to detect a relaxed condition and a pressed condition, together with input means such as tactile buttons and switches, touch activated control surfaces, and gesturing technologies, that might also rely on head and eye tracking technologies, as means of controlling their operation. For example, eye tracking technologies that respond to a user gazing at a particular object as a signal for moving a cursor or other controlled item to a location denoted by the user's gaze may be used in combination with the activation accessory such that the activation accessory can be employed to effect a selection, select and hold, and/or other control operation of a screen element at a screen location denoted by the user's gaze.

In some instances, eyeglasses employing activation accessories as discussed herein may be personalized to a wearer by creating a model, either physical or digital, of the wearer's head and face and fabricating an eyeglass frame specifically to suit the wearer according to the dimensions provided from the model. Modern additive manufacturing processes (commonly known as 3D printing) make such customizations economically feasible and eyeglass frames could readily be produced from images of a wearer's head and face captured using computer-based cameras and transmitted to remote server hosting a Web service for purchase of the visioning device(s) (or frames). For example, following instructions provided by the Web-based service, a user may capture multiple still images and/or a short video of his/her head and face. By including an object of known dimensions (e.g., a ruler, a credit card, etc.) within the field of view of the camera at the approximate position of the user's head as the images are captured, a 3D model of the user's head and face can be created at the server. The user can then be provided with an opportunity to customize an eyeglass frame to be sized to the dimensions of the model, selecting, for example, color, materials, the positions over the ears at which the eyeglasses will be worn, etc. Once the customizations are specified, and payment collected, the specification may be dispatched to a manufacturing facility at which the eyeglass frame is fabricated.

Eyeglasses such as those described herein may further support one or more communication earpieces (not shown) and/or one or more microphones (not shown), the earpiece(s) and microphone(s) allowing for communications to/from the wearer. The earpiece(s) and microphone(s) may be communicatively connected to a transceiver carried elsewhere on the wearer's person, either using wired or wireless connections. In other embodiments, the earpiece(s) and/or microphone(s) may be eliminated, and audio communications facilitated through bone conduction elements.

Although not shown in the various views, a power source for the electronics is provided and may be housed within the eyeglasses or located external thereto (e.g., worn on a vest or belt pack). In some cases, a primary power source may be located external to the eyeglasses and a secondary power source provided integral thereto. This would allow the primary power source to be decoupled from the eyeglasses which would then revert to using the secondary power source (e.g., a small battery or the like), at least temporarily. To facilitate this operation, the eyeglasses may be provided with one or more ports allowing connection of different forms of power supplies. Also, status indicators (e.g., LEDs or other indicators) may be provided in to provide information concerning the imaging elements, communication elements, available power, etc. In some embodiments, haptic feedback may be used for various indications, e.g., low battery, etc.

Frames of various eyeglasses may be fashioned from a variety of materials, including but not limited to plastics (e.g., zylonite), metals and/or metal alloys, carbon fiber, wood, cellulose acetates (including but not limited to nylon), natural horn and/or bone, leather, epoxy resins, and combinations of the foregoing. Fabrication processes include, but are not limited to, injection molding, sintering, milling, and die cutting. Alternatively, or in addition, one or more additive manufacturing processes, such as extrusion, vat photo-polymerization, powder bed fusion, material jetting, or direct energy jetting, may be used to fashion the illumination device and/or components thereof.

Activation/deactivation and/or other operation of the imaging elements, refractive elements, and/or audio communication elements of the eyeglasses may be effected through the use of integrated activation accessories 10 or attachable activation accessories 10, as applicable. Each of which may include one or more sensors of any of the kinds discussed above. The sensor is responsive to minimal displacements of the eyeglasses on which the sensor is positioned. The use of a such a sensor allows for remote operation of the refractive elements (and, optionally, other elements) of the device.

Figure 8:
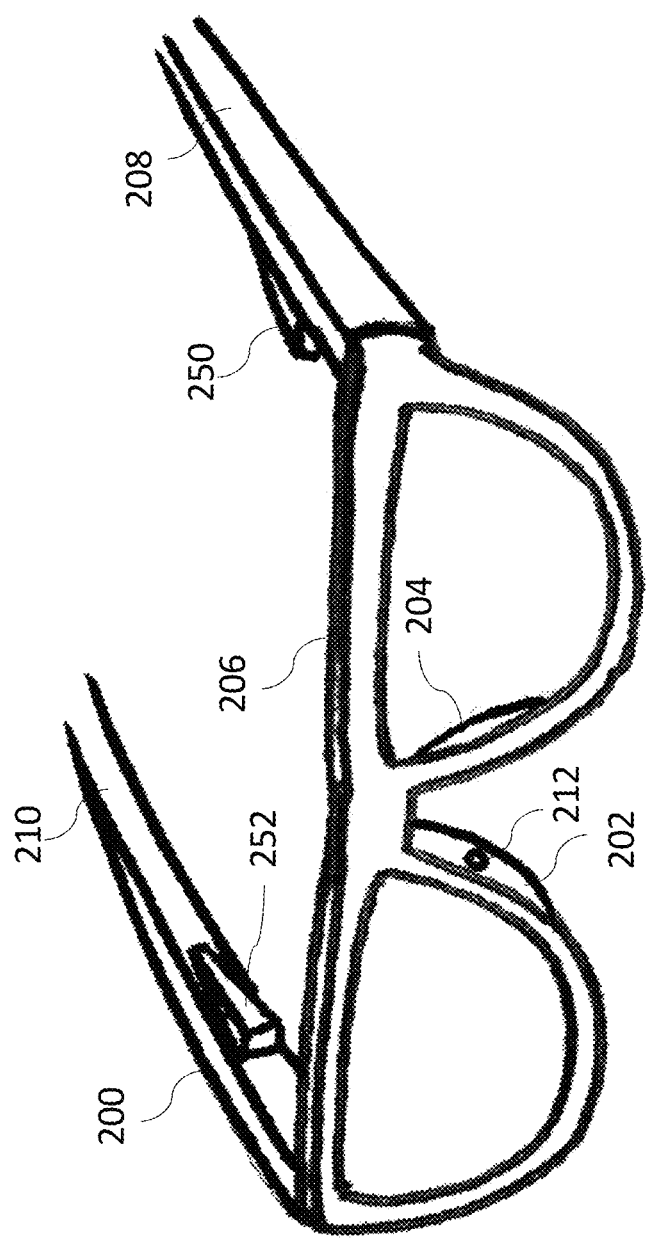
FIG. 8 illustrates a further example of an activation accessory configured in accordance with embodiments of the present invention that incorporate both nose piece switches/sensors and clench switches/sensors.

FIG. 8 illustrates yet a further embodiment of the present invention, which incorporates both nose piece switches/sensors and clench switches/sensors. Clench switches/sensors refers to systems for operating a controlled device that includes a module having a sensor and a moveable actuator, the sensor being configured to produce output signals according to a relative position of the actuator (e.g., the actuator itself or the relative position of the actuator to the sensor) to the sensor, and the module adapted to be worn on a person of a wearer by attachment to a headband of an augmented reality (AR) or virtual reality (VR) headset or a temple piece of a pair of eyeglasses, or similar arrangement. The moveable actuator may be configured to be displaceable relative to the sensor in a first plane different from a second plane defined by a width of the headband of an AR or VR headset or the temple piece of the pair of eyeglasses, as applicable. For example, If the headband or temple piece, as applicable, has a width in a vertical plane, the moveable actuator may be configured to be displaceable relative to the sensor in a plane approximately horizontal (i.e., approximately orthogonal to the second plane). By approximately, deviations of up to 5 degrees, or up to ten degrees from orthogonal are contemplated. Alternatively, or in addition, the moveable actuator may be configured to be displaceable relative to the headband of the AR or VR headset or the temple piece of the pair of eyeglasses, as applicable.

The clench switch/sensor system further includes a controller similar to that discussed above for the nose piece switch/sensor, coupled to receive the output signals from the sensor. The controller includes a processor and a memory coupled thereto, with the memory storing processor-executable instructions that, when executed by the processor, cause the processor to receive and evaluate the output signals of the sensor to determine whether or not the output signals of the sensor represent a command for the controlled device by assessing the output signals of the sensor for a signal pattern indicative of one or more volitional actions of the wearer of the module. In various embodiments, the processor-executable instructions cause the processor to evaluate the output signals from the sensor by evaluating the output signals against a stored library of command signal representations, where each command signal representation of the stored library of command signal representations characterizes an associated command for the controlled device; according to power spectral densities output signals from the sensor within specified time periods; according to count values of the sensor received within a specified time period; or against a trained model of command signal representations, where each command signal representation of the model characterizes an associated command for the controlled device. Further, when executed by the processor the processor-executable instructions further cause the processor, when the processor determines that the output signals of the sensor represent the command for the controlled device, to then decode the command for the controlled device and transmit a control signal to the controlled device via a communication element, or, otherwise, if the processor determines that the output signals of the sensor do not represent the command, then not transmit the control signal and proceed to evaluate further output signals of the sensor. And the system includes the communication element communicatively coupled to receive the control signal to the processor and to transmit the control signal to the controlled device. The controlled device may be the AR or VR headset or eyeglasses (e.g., refractive lenses thereof) on which the module is mounted or a different controlled device. And, the clench switch/sensor system may also include a vibration motor communicably coupled to receive an activation signal from the processor, wherein the processor-executable instructions, when executed by the processor, further cause the processor to transmit the activation signal when the processor determines that the output signals of the sensor represent the command for the controlled device.

Various embodiments of clench switch/sensor systems have an activation accessory that includes a moveable actuator having a range of travel between a fully extended position and fully compressed position, a sensor, and a communication element. The sensor is coupled to a controller, which has an output coupled to a control signal interface. The controller is programmed to receive and evaluate input signals from the sensor that are responsive to movements of the moveable actuator to determine whether or not they represent a command for the controlled device by assessing the input signals for a signal pattern indicative of a plurality of volitional actions of a wearer of the wearable device, e.g., jaw clenches that cause flexing/extension of the wearer's temporalis muscle. If/when the processor determines that the input signals represent the command, then it decodes the command and transmits an associated control signal to the controlled device via the control signal interface.

In one example, the activation accessory includes a Hall effect sensor, and a magnet is positioned on the moveable actuator so that it causes the Hall effect sensor to output signals to the controller due to movements of the moveable actuator. The controller includes a processor and a memory coupled thereto which stores processor-executable instructions that, when executed by the processor, cause the processor to receive and evaluate input signals from the Hall effect sensor. In particular, the controller evaluates the input signals to determine whether or not they represent a command for the controlled device by assessing the input signals for a signal pattern indicative of any of a plurality of such commands. If/when the processor determines that the input signals represent one of the plurality of commands, then it decodes the respective command and transmits an associated control signal to the controlled device via the control signal interface. The controller may also provide feedback to the wearer by providing an activation signal to a vibration motor. On the other hand, if the processor determines that the input signals from the sensor do not represent a command, no control signal or activation signal is transmitted and the processor proceeds to evaluate further/new input signals from the Hall effect sensor in a like manner as the original input signals.

A communication element, which may be a part of the activation accessory or otherwise included/integrated in the wearable device, is coupled to the control signal interface and is adapted to transmit the control signal from the processor to the controlled device. For example, the communication element may be a cable having a plug configured to mate with a jack at the controlled device, or a transmitter adapted for radio frequency communication with a receiver at the controlled device.

In various embodiments, the moveable actuator may be supported in or by a mount on the wearable device, such as a temple piece or the frame of eyewear (e.g., eyeglasses, goggles, AR/VR headset, etc.), a headset, or another arrangement. For example, the moveable actuator may be moveable with respect to a temple piece or frame of the eyewear, or a frame of a headset, so as to permit operation of the activation accessory at different positions on the wearer. In one example, the moveable actuator of the actuation accessory may be positioned on the moveable device so that when the moveable device is being worn the moveable actuator touches the skin of the wearer overlying an area of the wearer's temporalis muscle, or the tendon which inserts onto the coronoid process of the mandible, or masseter muscle. The temporalis muscle and masseter muscle can generally be felt contracting while the jaw is clenching and unclenching, and it is such clench actions which, by virtue of the resulting movement of the moveable actuator, can cause the sensor to output signals to the controller.

In some cases, the moveable actuator of the activation accessory may be supported in a helmet or mask (e.g., a helmet or mask used by a firefighter, a diver, an aircrew member, or another wearer), where the mask is configured to position the moveable actuator so as to be overlying an area of the wearer's temporalis muscle. Alternatively, the entire activation accessory may be included in a module having an adhesive applied to a surface thereof to enable a module encasing the activation accessory to be worn directly on the face or head of the wearer. Such an adhesive may, in one case, be in the form of a removeable film adhered to the surface of the module that encloses the activation accessory.

The activation accessory may include more than one Hall effect sensor, and/or sensors of different types, with the multiple sensors arranged with respect to one another so as to permit individual and/or group activation thereof by associated volitional jaw clench (or other muscle activity) actions of the wearer. Further, in addition to a vibrational motor, a visual activation indicator may be present. Such a visual activation indicator (e.g., an LED) may be coupled to receive a visual activation indication signal from the controller and the processor-executable instructions, when executed by the processor, may further cause the processor to perform transmit the visual activation indication signal to the visual activation indicator if/when the processor determines that input signals from one or more of the sensors represent a command for the controlled device.

When assessing the input signals from a Hall effect sensor or other sensor for the signal pattern indicative of a command for the controlled device, the processor may evaluate the input signals against a stored library of command signal representations, where each command signal representation characterizes an associated command for the controlled device. Alternatively, or in addition, the input signals may be assessed according to respective power spectral densities thereof within specified time periods. Or the input signals may be assessed according to count values of the Hall effect sensor(s) received within a specified time period. Still further, the input signals may be evaluated against a trained model of command signal representations, where each command signal representation characterizes an associated command for the controlled device.

Including both nose piece switches/sensors and temple piece clench sensors allows a wearer to perform a variety of command inputs thorough either or both of the switch/sensor arrangements by either clenching, tapping, or pressing and holding on both temple pieces with one or two hands, or combinations of these actions, simultaneously (r nearly so, consecutively, or independently. For example, a wearer may independently actuate right and/or left temple piece sensors by tapping or pressing and holding on one or both temple pieces. Or, the wearer may actuate both nose piece switches simultaneously (or nearly so) by pushing on the bridge of the eyeglasses frame to perform a "double-click." Still further, the wearer may actuate right and/or left nose piece switches independently by pushing on the right or left side of the eyeglasses frame to perform a "single-click." Many other command input actions are possible given the various sensor arrangements and activation combinations. By way of example, the various sensors/switches may work together or independently to facilitate a right-side tap input, a right-side press and hold input, and a right-side "push to click" input. Pressing to actuate a switch/sensor may require a "lighter" touch than a push input; stopping short of actuating a tactile switch which requires a "push" so that the nose piece switch mechanically actuates. Thus, multiple sensors/switches can be provided in order to expand the available input commands for controlling an electronic system. These sensors and switches may provide for input commands/command sequences that correspond to signals produced by volitional temporalis muscle movements or to signals produced by tapping, pressing, or pushing on various rigid structures of the eyeglass frames and temple pieces with the fingers or the hand.

Referring to FIG. 8, eyeglasses 200 include left and right nose pieces 202, 204, bridge 206, and temple pieces 208, 210. A compression switch 212 included on nose piece 202. A similar compression switch may or may not be included on nose piece 204. Temple sensors/switches 250, 252 are included on temple pieces 208, 210, respectively. Temple sensor/switches 250, 252 may permit signal generation via a control surface that can be activated by direct or indirect force, hinged paddle, touch-sensitive surface, or other tactile actuation device. Devices configured in accordance with these embodiments may employ moveable structures (e.g., hinged frame pieces, paddles or other actuators) that house Hall effect sensors to detect a change in an electromagnetic field when a corresponding magnet is moved in proximity to a sensor. Such devices may be in the form of an accessory (as shown) or fully integrated into temple pieces 208, 210.

As mentioned, the temple switches/sensors 250, 252 are positioned on the temple pieces 208, 210, so as to be near an area of a wearer's face overlying the temple. That is, the temple switches/sensors 250, 252 have one or more active control surfaces (e.g., Hall effect sensors, piezo switches, micro tactile switches, etc.) positioned to contact the right (and/or) left side of the wearer's face typically above and to the outside of the eyeline. However, it may also encompass the area of a wearer's forehead. The active control surfaces are configured to detect a relaxed condition and a flexed condition of the wearer's temple or forehead, thereby allowing the wearer to generate input signals for controlling electronic system components via temple (temporalis muscle), eyebrow, etc., manipulation. The temple switches/sensors 250, 252 are adjustable in terms of their positioning of one or more of the active control surfaces within the area(s) overlying the temple or forehead and means for adjusting the contact pressure of the active control surfaces against the wearer's face (e.g., springs, hinges, etc.) may be provided. The temple switches/sensors 250, 252 may be included in a module similar to module 14 described above, and constructed to house one or more of the electronic system components (e.g., lights, cameras, displays, laser pointers, a haptic engine in the form of a vibration motor, etc.) that is being controlled by temple, eyebrow, or other manipulation.

When the eyeglasses are worn so that, for example, an actuator of one or more temple switches/sensors 250, 252 is/are positioned so as to overlie the wearer's temporalis muscle so as to be responsive to jaw clenches or other jaw movements of the wearer, both hands free and tap/press activation, deactivation, and/or operation of one or more controlled devices is possible. For example, to activate, deactivate, and/or operate a controlled device that is communicably coupled to the activation accessory, e.g., via the communication element, the wearer of the eyeglasses can perform one or more jaw clench actions. By clenching and unclenching his/her jaw, the wearer's temporalis muscle will be engaged and will expand and contract in the region of the wearer's temple. Because the actuator of the temple switches/sensors 250, 252 is/are positioned so as to overlie the wearer's temporalis muscle in the region of the wearer's temple, when the wearer's temporalis muscle expands and contracts in accordance with the wearer's jaw clench actions, the actuator, which presses on the skin of the wearer in the temple region, is moved. In one example, a jaw clench or movement causes the actuator to move laterally with respect to the wearer and a jaw unclenching or other movement causes the moveable actuator to move medially with respect to the wearer. Other motions of the actuator, such as rotations, may also be invoked through muscle movement. As described above for the nose piece switches/sensors, these movements of the moveable actuator are registered by a sensor associated with the temple switches/sensors 250, 252 and recognized by an associated controller as commands for the controlled device. Once so recognized, the commands are issued to the controlled device via the communication element. In addition to jaw clenching and unclenching, other movements of the jaw, for example lateral-medial movements, are contemplated for actuation of an actuator. Lateral-medial movements, clenching and unclenching, and other jaw movements that result in flexing and relaxing of a wearer's temporalis muscle are contemplated and are generally referred to herein as volitional movements.

In addition to this form of hands-free operation of the controlled device, the same wearable module or a wearable electronic controller can be used to activate, deactivate, and/or control the controlled device via touch actions of the wearer. For example, considering the same temple switches/sensors 250, 252 with an actuator positioned so as to overlie the wearer's temporalis muscle in the region of the wearer's temple as in the above example, the wearer may cause the wearable module or a wearable electronic controller to move with respect to its associated sensor by touching/pressing the eyeglasses (e.g., the temple pieces) instead of (or in addition to) clenching/unclenching his/her jaw. If the actuator were positioned along one of the temple pieces of the eyewear so as to contact the wearer's skin in the region of the wearer's temple, then when the wearer pressed the temple piece of the eyewear towards his/her head (i.e., moved the temple piece medially towards his/her head), the actuator would move with respect to its sensor and cause the sensor to produce a signal just as if the actuator had moved responsive to a jaw clench. And, when the wearer released the temple piece of the eyewear and the temple piece of the eyewear moved laterally away from the wearer's head, the actuator would return to its original position with respect to the sensor, still touching the wearer's skin in the region of the wearer's temple, but now extended from the position it was in when the wearer was pressing on the temple piece. This touch/press responsiveness of the temple switches/sensors 250, 252 in addition to its responsiveness to hand-free actions of the wearer provides a very versatile set of operating characteristics for an activation accessory of a wearable device and a wide range of potential operating commands for controlled devices could be made up of successive hands-free/touch-press actions of a wearer.

As noted, in embodiments of the invention a sensor or multiple sensors of an activation accessory is/are responsive to movements of an actuator. One such sensor is a Hall effect sensor that is responsive to movements of a magnet (e.g., a magnet disposed in an actuator that is moveable with respect to the Hall effect sensor). Other sensors could be used and several examples are discussed above. The sensor is communicably coupled to a controller of the activation accessory (or another controller that is included in the wearable device), and the controller has an output coupled to a control signal interface. Generally, the controller may include a processor and a memory coupled to the processor, which memory stores processor-executable instructions that, when executed by the processor, cause the processor to perform various operations. For example, the stored processor-executable instructions, when executed by the processor, may cause the processor to receive, from the one or more sensors, input signals that are produced as outputs of the sensor(s) responsive to movements of the actuator. The instructions may cause the processor further to evaluate the input signals to determine whether or not the input signals represent a command for said controlled device. Since the activation accessory is part of or attached to a wearable device, it is conceivable that some motion of the actuator, and, hence, some signals output by the sensor(s) to the processor of the controller, may be associated with movements of the wearer and/or the eyeglasses that are not intended as movements representing commands for the controlled device. An example might be the wearer talking or eating. Such actions can be expected to cause the wearer's temporalis muscle to expand and contract, thereby causing an actuator positioned so as to be overlying the wearer's temporalis muscle in the region of the wearer's temple to move. This movement of the actuator would, in turn, cause the associated sensor(s) to produce output signals to the processor of the controller, but those signals should not cause the processor to issue commands to the controlled device because the wearer's movements were not intended to be interpreted as such commands. To address this situation and mitigate the effect of such movements of the wearer vis-à-vis commands issued to the controlled device, a filtering and/or analysis process may be used by the controller to distinguish volitional actions of the wearer that are intended as commands from those which are not.

Examples of the filtering and analysis process may include such things as band-pass filtering of the signals output by the sensor(s) so as to prevent high and/or low frequency signals, associated with high and/or low speed movements of the actuator, from being interpreted as signals associated with commands. Signals of a relatively high frequency may be regarded as being associated with rapid movements of the actuator, which may be indicative of movements of the wearer's jaw or other muscle(s) when engaged in activities not associated with issuing commands for a controlled device (e.g., eating, talking, etc.). Similarly, relatively low frequency signals may be regarded as being associated with relatively slow movements of the actuator, which may be indicative of movements of the wearer's jaw or other muscle(s) when engaged in activities not associated with issuing commands for a controlled device (e.g., stretching). By filtering out such relatively high and/or low frequency signals before they are provided to the processor of the controller for analysis (or by filtering of such relatively high and/or low frequency signals by the processor as a first step in any analysis), the present invention can avoid the issue of unintended commands to the controlled device.

Other actions in place of or in addition to this kind of filtering can be employed. For example, a microphone could be used in conjunction with the activation accessory (or as part thereof) and signals produced by the microphone when the wearer of the activation accessory is speaking provided to the processor. The stored processor-executable instructions, when executed by the processor, may be such that the processor, upon recognizing that the wearer is speaking, may ignore signals from the sensor(s) associated with the actuator as any such signals are likely to be the result of movement of the wearer's temporalis muscle (and, hence, the actuator) due to such speaking and not the result of the wearer issuing a command for the controlled device. Of course, the processor could be programmed so as to search for special signal patterns that indicate command sequences even when speaking is detected so that the activation accessory can be used to activate, deactivate, and/or control a controlled device even when the wearer is engaged in a conversation.

Further, and as discussed in above with respect to the nose piece switches/sensors, the stored processor-executable instructions, when executed by the processor, may cause the processor to assess the input signals from the temple piece switch(es)/sensor(s) for one or more signal patterns indicative of a command for a controlled device, for example, by comparing time domain, frequency domain, or other representations of such signals to a stored library of command signal representations. By digitizing and then transforming received input signals from the sensor(s) using a Fast Fourier Transform algorithm or wavelet transform algorithm, for example, the processor may compare patterns of received input signals to stored replicas of known command clench and/or touch/press operations of the activation accessory and issue commands to the controlled device accordingly.

If the processor determines that the input signals from the sensor(s) represent a command for the controlled device, then the stored processor-executable instructions, when executed by the processor, may cause the processor to decode the command and, subsequently, transmit an associated control signal to the control signal interface. Otherwise, if the processor determines that the input signals from the sensor(s) do not represent a command for the controlled device, then the stored processor-executable instructions, when executed by the processor, will cause the processor to not transmit such a control signal and instead to proceed to evaluate further or new input signals from the sensor.

The communication element, which may be part of the activation accessory or another component of the wearable device, is coupled to the control signal interface and is adapted to transmit control signals from the processor to the controlled device. For example, the communication element may be a simple a cable having a plug configured to mate with a jack at the controlled device. Or the communication element may be a transmitter adapted for radio frequency communication with a receiver at the controlled device. Any of several kinds of radio frequency communications may be used, for example, Bluetooth, Bluetooth Low Energy (BLE), Zigbee, infrared, WiFi HaLow (IEEE 802.22h), Z-wave, Thread, SigFox, Dash7, or other form of radio frequency communication.

As noted, the activation accessory may be integrated into or attached to a pair of eyeglasses such that when the eyeglasses are worn on a person the actuator of the activation accessory is touching the person at an area overlying the person's temporalis or other muscle. The actuator is preferably moveable with respect to a portion of the eyeglasses, in which case the moveable actuator may be supported in a temple piece or a frame of the eyewear.

The temple switches/sensors 250, 252 has/have a moveable control portion (e.g., a lever) and a detection portion. The moveable control portion has a defined range of travel in relation to the detection portion between a fully extended position and a fully seated position. In some instances, the moveable control portion may be biased (e.g., by a spring, hinge, living hinge, or other arrangement) so as to maintain its fully extended position until compressed towards its fully seated position by an outside force. When worn, the wearable sensor module contacts the wearer so that the moveable control portion partially compresses. This partial compression results in the detection portion producing an initial signal; for example, upon the wearer donning the eyeglasses, the detection portion may produce the initial input signal as a result of movement (compression) of the moveable control portion when coming into contact with the wearer's body in a region overlying the wearer's temporalis muscle (e.g., at or near the wearer's temple). The initial signal may cause the wearable sensor module to wake from a sleep or inactive state so that subsequent movements of the moveable control portion, e.g., caused by flexing and relaxing of the wearer's muscle(s) over which the sensor module is positioned or the wearer touching/pressing the eyeglasses, cause the sensor to produce further signals that, when recognized by a controller of the wearable sensor module or the wearable device in which it is instantiated or to which it is attached, result in commands for controlling the electronic device to be generated. Similar activation of the nose piece switches/sensors may be employed.

The detection portion of the temple switches/sensors 250, 252 is/are preferably configured to detect varying degrees of movement of the moveable control portion, which varying degrees of movement result in commands for controlling the electronic device to be generated. That is, it is recognized that the eyewear may be worn by different individuals, some or all of which may have heads of different shapes and sizes. So, the moveable control portion of the temple switches/sensors 250, 252 may be actuated to different degrees by the different wearers. The detection portion is arranged and situated with respect to the moveable control portion so as to be responsive to these different degrees of actuation of the moveable control portion, e.g., different lengths of travel or movement thereof due to jaw clenching or touching/pressing.

As mentioned, when the moveable control portion is not experiencing any external forces acting upon it, it is biased open from the detection portion, e.g., by a hinge or layer of over-molded elastic polymer that provides spring-like bias. Then, when the moveable control portion contacts the wearer, e.g., being donned by the wearer, it is partially compressed along its length of travel with respect to the detection portion. This may happen, for example, when the moveable control portion contacts an area of the wearer's head or face overlaying the temporalis or other muscle.

The detection portion of the temple switches/sensors 250, 252 may be removably attached or slidably attached to the wearable electronic device. Such configurations may allow for replacement of broken or damaged detection portions. Alternatively, the detection portion may be integrated as part of the eyeglasses. And, as described above, input actuations of the moveable control portion may be generated both in a hand-free manner and/or manually by tapping or pressing the wearable electronic device to cause the moveable control portion to compress against or extend away from an area of the body over which the wearable sensor module is positioned. The various sensor modules are thus configured to detect the movement of the moveable control portion as having been affected by tapping or pressing on the medial or lateral side of the eyeglasses when being worn.

Examples of moveable actuators and sensors for temple piece switches/sensors include a lever arm that is biased open with respect to a detection sensor by a spring so as to be extended or open when the eyeglasses are not being worn. When the lever arm is displaced so that a magnet is in the vicinity of the sensor (which may be a Hall effect sensor), the sensor produces an output signal. Alternatively, the moveable actuator may be an over molded elastomer member that is supported on a pliable gasket or similar joint and the sensor may be an optical sensor that produces an output signal responsive to movements of the moveable actuator towards and/or away from the sensor. Alternatively, the moveable actuator may be biased in an open position with respect to the sensor by one or more springs so that when acted on by a force (e.g., a muscle movement due to a jaw clench or a touch/press), the moveable actuator moves towards the sensor, causing a U-shaped leaf, which may be made of spring steel or another conductive material, to contact the sensor, resulting in the sensor producing an output signal. The sensor may be force-sensitive so that the magnitude of the output signal is responsive to the pressure exerted upon it by the U-shaped leaf; thus, an initial pressure due to a wearer donning the eyeglasses may cause the sensor to output a signal of a magnitude indicative of a wake signal, while subsequent pressures due to jaw clench actions and/or touch/press actions of the wearer may cause the moveable actuator to further compress the U-shaped leaf, resulting in greater pressure on the sensor and causing the sensor to output signals of a magnitude indicative of control inputs for the controlled device. Alternatively, the moveable actuator may be a lever arm that is biased open with respect to the sensor by a living hinge so as to be extended or open when the activation element is not being worn. Other arrangements are also feasible. For example, fiber optic compression sensors in which the illuminance of a photonically energized (e.g., by an LED) fiber optic cable as detected by a photosensor is varied according to the compression of a sleeve or other attenuator surrounding or enclosing the fiber optic cable (e.g., by the action of a moveable actuator responsive to jaw clench or touch/presses of a wearer). Photosensor output may be analyzed and processed as an input command for controlling electronic devices in the manner described herein. Such a sensor/controller arrangement is very lightweight and unobtrusive, requires no electronic components (and so is highly rugged/waterproof), features low-compute signal processing, provides variable input and is very low cost. The sensor's actuator can be placed away from the light source and photosensor expanding design flexibility.

Thus, nose piece switches/sensors and related temple piece switches/sensors for eyeglasses, goggles, visor, mask, headset, and/or other head-worn items and systems and methods for operating a controlled device in a remote manner using such switches/sensors have been described.

What is claimed is:

1. An activation accessory for eyewear, comprising one or more switch elements integrated with or attached to a nose piece of the eyewear, the one or more switch elements each communicably coupled to a controller configured to receive first input signals comprising a temporal or patterned sequence of inputs from the one or more switch elements responsive to wearer-initiated activations of the one or more switch elements, said one or more switch elements activated by a wearer pressing on a portion of a frame or temple piece of the eyewear while the eyewear is being worn by the wearer, evaluate the temporal or patterned sequence of inputs of the first input signals to determine whether or not they represent a command for a controlled device by assessing the first input signals to determine whether the temporal or patterned sequence of inputs are a signal pattern representative of said command, and to issue said command to the controlled device when said evaluation determines that the temporal or patterned sequence of inputs of the first input signals do represent said command, or otherwise to receive and evaluate further input signals from the one or more switch elements by assessing the further input signals for the temporal or patterned sequence of inputs representative of said command when said evaluation determines that the temporal or patterned sequence of inputs of the first input signals do not represent said command.

2. The activation accessory for eyewear of claim 1, wherein the one or more switch elements include one of: tactile microswitches, piezo switches, pneumatic pressure sensors, force sensors, or strain gauge sensors.

3. The activation accessory for eyewear of claim 1, wherein the one or more switch elements are configured to detect movement of a flexible portion of the nose piece in comparison to rigid structural components of the eyewear when acted upon by a force and to produce output signals to the controller responsive thereto.

4. The activation accessory for eyewear of claim 1, wherein the one or more switch elements include flexible actuation arms coupled to silicone pads.

5. The activation accessory for eyewear of claim 1, wherein the one or more switch elements are sealed within watertight membranes.

6. The activation accessory for eyewear of claim 1, wherein the one or more switch elements comprise living hinge elements.

7. The activation accessory for eyewear of claim 1, wherein the one or more switch elements comprise hinged paddles.

8. The activation accessory for eyewear of claim 1, wherein the one or more switch elements comprise microswitches contained within domes.

9. The activation accessory for eyewear of claim 1, wherein the one or more switch elements each include a moveable actuator that is biased open with respect to a sensor when the switch element is not activated.

10. The activation accessory for eyewear of claim 1, wherein the one or more switch elements comprise compression switches integrated with or attached to the nose piece of the eyewear.

11. The activation accessory for eyewear of claim 10, wherein the one or more switch elements include Hall effect sensors.

12. Eyewear comprising a frame, temple pieces attached to the frame, and one or more switch elements integrated with or attached to a nose piece of the frame, the one or more switch elements each communicably coupled to a controller attached to one of the temple pieces and configured to receive first input signals comprising a temporal or patterned sequence of inputs from the one or more switch elements responsive to wearer-initiated activations of the one or more switch elements, said switch elements activated by a wearer pressing on a portion of the frame or temple pieces of the eyewear while the eyewear is being worn by the wearer, evaluate the temporal or patterned sequence of inputs of the first input signals to determine whether or not they represent a command for a controlled device by assessing the first input signals to determine whether the temporal or patterned sequence of inputs are a signal pattern representative of said command, and to issue said command to the controlled device when said evaluation determines that the temporal or patterned sequence of inputs of the first input signals do represent said command, or otherwise to receive and evaluate further input signals from the one or more switch elements by assessing the further input signals for the temporal or patterned sequence of inputs representative of said command when said evaluation determines that the temporal or patterned sequence of inputs of the first input signals do not represent said command.

13. The eyewear of claim 12, wherein the nose piece includes left and right nose piece elements and the switch elements include compression switches integrated with each of the left and right nose piece elements.

14. The eyewear of claim 12, wherein the nose piece includes left and right nose piece elements and the switch elements include hinged paddle switches integrated with each of the left and right nose piece elements.

15. The eyewear of claim 12, wherein the nose piece includes left and right nose piece elements and the switch elements include living hinges integrated with each of the left and right nose piece elements.

16. The eyewear of claim 12, wherein the nose piece is an over-molded nose piece and the switch elements include respective left and right sensors attached to or embedded within the over-molded nose piece.

17. The eyewear of claim 12, wherein the nose piece includes left and right nose piece elements and the switch elements include moveable actuators attached to each of the left and right nose piece elements.

18. The eyewear of claim 17, wherein the switch elements also include Hall effect sensors responsive to movements of the moveable actuators.

19. The eyewear of claim 17, wherein the switch elements also include microswitches responsive to movements of the moveable actuators.

20. A method of controlling a controlled device, comprising a controller receiving first input signals comprising a temporal or patterned sequence of inputs from one or more switch elements, each of the one or more switch elements integrated with or attached to a nose piece of eyewear and configured to provide the first input signals to the controller responsive to wearer-initiated activations of the one or more switch elements, said one or more switch elements being activated by a wearer pressing on a portion of a frame or temple piece of the eyewear while the eyewear is being worn by the wearer, the controller thereafter evaluating the temporal or patterned sequence of inputs of the first input signals to determine whether or not they represent a command for the controlled device by assessing the first input signals to determine whether the temporal or patterned sequence of inputs are a signal pattern representative of said command, and issuing said command to the controlled device when said evaluation determines that the temporal or patterned sequence of inputs of the first input signals do represent said command, or otherwise receiving and evaluating further input signals from the one or more switch elements by assessing the further input signals for the temporal or patterned sequence of inputs representative of said command when said evaluation determines that the temporal or patterned sequence of inputs of the first input signals do not represent said command.

* * * * *